(12) United States Patent
Arrez et al.

(10) Patent No.: US 7,871,233 B2
(45) Date of Patent: Jan. 18, 2011

(54) FRONT LOAD CONTAINER LIFTER

(75) Inventors: Carlos Arrez, Berwyn, IL (US); Sergio Arrez, Romeoville, IL (US); James Rimsa, Maywood, IL (US); Ramiro Arrez, Orland Park, IL (US)

(73) Assignee: Perkins Manufacturing Company, Romeoville, IL (US)

( * ) Notice: Subject to any disclaimer, the term of this patent is extended or adjusted under 35 U.S.C. 154(b) by 611 days.

(21) Appl. No.: 11/736,167

(22) Filed: Apr. 17, 2007

(65) Prior Publication Data

US 2007/0243050 A1   Oct. 18, 2007

Related U.S. Application Data

(60) Provisional application No. 60/744,960, filed on Apr. 17, 2006, provisional application No. 60/891,608, filed on Feb. 26, 2007.

(51) Int. Cl.
*B66F 3/02* (2006.01)

(52) U.S. Cl. .................. 414/408; 414/555; 187/269
(58) Field of Classification Search ............ 414/408, 414/555; 187/269
See application file for complete search history.

(56) References Cited

U.S. PATENT DOCUMENTS 1,475,483 A   11/1923  Galuska (Continued)

FOREIGN PATENT DOCUMENTS

AT   243183   10/1965

(Continued)

OTHER PUBLICATIONS

Lifting Mechanism for a Sanitation Vehicle, U.S. patent application Ser. No. 378,823, filed May 12, 1982, now abandoned (bearing production Nos. B984-1005), with photographs (dated Dec., 1981) (bearing production Nos. B1082-1097), photographs of a present version of the above cited reference (bearing production Nos. B1098-1110A), and other related documents (bearing production Nos. 935-937, 939, 941-947, 948-977, 979, 981, 983, 1006-1025, and 1111-1125).

(Continued)

*Primary Examiner*—James Keenan
(74) *Attorney, Agent, or Firm*—Cook Alex Ltd.

(57) ABSTRACT

A cart lifter is provided that is adapted to be mounted to a refuse container or directly to a refuse collection vehicle. A support is provided that is adapted to be pivotally mounted adjacent to the loading area of either the refuse container or the vehicle. First and second support arms are provided that are carried by the pivoting support. The support arms are movable relative to the support frame between a first position in which the support arms are adjacent the refuse container or vehicle and a second position in which the support arms are relatively angularly disposed with their free ends being spaced outwardly away from the support frame. A container capturer is provided for engaging and releasing a smaller refuse collection cart, and the free ends of each of the support arms are adapted to carry the container capturer. Actuators are provided for pivoting the support frame relative to the container or vehicle to dump or invert the refuse collection cart, to move the support arms between the first position for storage and/or dumping and the second position for capturing or releasing a cart, and an actuator for actuating the container capturer so that it can engage and release the refuse collection cart.

13 Claims, 28 Drawing Sheets

U.S. PATENT DOCUMENTS

| | | | |
|---|---|---|---|
| 1,763,499 A | 6/1930 | Bolger | |
| 2,480,959 A | 9/1949 | Presnell | |
| 2,824,658 A | 2/1958 | Beasley | |
| 3,032,216 A | 5/1962 | McCarthy | |
| 3,040,919 A | 6/1962 | Nolan | |
| 3,136,436 A | 6/1964 | Erlinder et al. | |
| 3,147,870 A | 9/1964 | Urban et al. | |
| 3,162,317 A * | 12/1964 | Becker | 414/664 |
| 3,170,580 A | 2/1965 | Soyko | |
| 3,211,312 A | 10/1965 | Miller | |
| 3,270,902 A | 9/1966 | Breault | |
| 3,279,633 A | 10/1966 | Evers | |
| 3,327,876 A | 6/1967 | Kolling | |
| 3,415,169 A | 12/1968 | Naddell | |
| 3,484,006 A | 12/1969 | Burke | |
| 3,516,562 A | 6/1970 | Knight | |
| 3,557,967 A * | 1/1971 | Madole | 414/549 |
| 3,576,215 A | 4/1971 | Cline | |
| 3,576,265 A | 4/1971 | Brady et al. | |
| 3,662,910 A | 5/1972 | Herpich et al. | |
| 3,730,365 A | 5/1973 | Herpich et al. | |
| 3,732,997 A | 5/1973 | Reavis et al. | |
| 3,738,516 A | 6/1973 | Wells | |
| 3,747,785 A | 7/1973 | Dahlin | |
| 3,762,586 A | 10/1973 | Updike, Jr. | |
| 3,773,197 A | 11/1973 | Blakely et al. | |
| 3,804,277 A | 4/1974 | Brown et al. | |
| 3,822,802 A | 7/1974 | Evans, Jr. | |
| 3,823,973 A | 7/1974 | Ramer | |
| 3,827,587 A | 8/1974 | Liberman et al. | |
| 3,837,512 A | 9/1974 | Brown | |
| 3,841,508 A | 10/1974 | Ebeling et al. | |
| 3,844,434 A | 10/1974 | Blakely et al. | |
| 3,861,547 A | 1/1975 | Sink, Sr. | |
| 3,884,376 A | 5/1975 | Rivers | |
| 3,894,642 A | 7/1975 | Shive | |
| 3,901,255 A | 8/1975 | Pettit | |
| 3,921,839 A * | 11/1975 | Herpich | 414/408 |
| 3,931,901 A | 1/1976 | Jones | |
| 3,944,092 A | 3/1976 | Ebeling et al. | |
| 3,954,194 A | 5/1976 | Stedman | |
| 3,964,624 A | 6/1976 | Werder | |
| 3,978,999 A | 9/1976 | Ryder | |
| 4,034,649 A | 7/1977 | Harvey et al. | |
| 4,042,137 A | 8/1977 | Hughes et al. | |
| 4,057,156 A | 11/1977 | Thompson et al. | |
| 4,090,626 A | 5/1978 | Ebeling et al. | |
| 4,091,944 A | 5/1978 | Gollnick | |
| 4,096,959 A | 6/1978 | Schaffler | |
| 4,113,125 A | 9/1978 | Schiller | |
| 4,175,903 A | 11/1979 | Carson | |
| 4,219,298 A | 8/1980 | Stragier et al. | |
| 4,227,849 A | 10/1980 | Worthington | |
| 4,230,359 A | 10/1980 | Smith | |
| 4,237,857 A | 12/1980 | Sharp, Sr. | |
| 4,239,437 A | 12/1980 | Naab | |
| 4,295,776 A | 10/1981 | Payne et al. | |
| 4,313,707 A | 2/1982 | Bingman et al. | |
| 4,345,868 A | 8/1982 | Rizzo et al. | |
| 4,348,147 A | 9/1982 | Helm | |
| 4,349,305 A | 9/1982 | Wynn et al. | |
| 4,363,588 A | 12/1982 | Stickney | |
| 4,365,922 A | 12/1982 | Borders | |
| 4,401,407 A | 8/1983 | Breckenridge | |
| 4,422,814 A | 12/1983 | Borders | |
| 4,427,333 A | 1/1984 | Ebeling | |
| 4,435,117 A | 3/1984 | House | |
| 4,450,828 A | 5/1984 | Oaken et al. | |
| 4,461,607 A | 7/1984 | Smith | |
| 4,461,608 A | 7/1984 | Boda | |
| 4,479,751 A | 10/1984 | Wyman et al. | |
| 4,527,939 A | 7/1985 | Suarez | |
| 4,538,951 A | 9/1985 | Yeazel et al. | |
| 4,543,028 A | 9/1985 | Bell et al. | |
| 4,548,542 A | 10/1985 | Reese | |
| 4,557,658 A | 12/1985 | Lutz | |
| 4,566,840 A | 1/1986 | Smith | |
| 4,575,300 A | 3/1986 | George | |
| 4,597,710 A | 7/1986 | Kovats | |
| 4,597,712 A | 7/1986 | Smith | |
| 4,613,271 A | 9/1986 | Naab | |
| 4,647,267 A | 3/1987 | Hund, Jr. | |
| 4,669,940 A | 6/1987 | Englehardt et al. | |
| 4,673,327 A | 6/1987 | Knapp | |
| 4,687,405 A | 8/1987 | Olney | |
| 4,699,557 A | 10/1987 | Barnes | |
| 4,708,570 A | 11/1987 | Smith et al. | |
| 4,715,767 A | 12/1987 | Edelhoff et al. | |
| 4,722,658 A | 2/1988 | Wurtz et al. | |
| 4,726,726 A | 2/1988 | Dossena et al. | |
| 4,741,658 A | 5/1988 | Zelinka et al. | |
| 4,773,812 A | 9/1988 | Bayne et al. | |
| 4,844,682 A | 7/1989 | Edelhoff | |
| 4,872,801 A | 10/1989 | Yeazel et al. | |
| 4,909,564 A | 3/1990 | Pfeifer et al. | |
| 4,911,600 A | 3/1990 | Zelinka et al. | |
| 4,936,732 A | 6/1990 | Naab et al. | |
| 4,966,514 A | 10/1990 | Knapp | |
| 4,983,092 A | 1/1991 | Richards | |
| 4,986,074 A | 1/1991 | Hahmann et al. | |
| 4,992,018 A | 2/1991 | Prout et al. | |
| 5,002,450 A | 3/1991 | Naab | |
| 5,007,786 A | 4/1991 | Bingman | |
| 5,015,142 A | 5/1991 | Carson | |
| 5,015,143 A | 5/1991 | Carson | |
| 5,018,929 A | 5/1991 | Carson | |
| 5,020,844 A | 6/1991 | Pickrell | |
| 5,024,573 A | 6/1991 | Redding et al. | |
| 5,026,104 A | 6/1991 | Pickrell | |
| 5,028,196 A | 7/1991 | Richards | |
| 5,035,563 A | 7/1991 | Mezey | |
| 5,045,026 A | 9/1991 | Buse | |
| 5,049,026 A | 9/1991 | Bingman et al. | |
| 5,056,979 A | 10/1991 | Niederer et al. | |
| 5,069,593 A | 12/1991 | Zelinka et al. | |
| 5,071,303 A | 12/1991 | Carson | |
| 5,071,307 A | 12/1991 | Carson | |
| 5,088,531 A | 2/1992 | Wade | |
| 5,092,731 A | 3/1992 | Jones et al. | |
| 5,098,250 A | 3/1992 | Carson | |
| 5,114,304 A | 5/1992 | Edelhoff et al. | |
| 5,139,110 A * | 8/1992 | Kishi | 187/244 |
| 5,163,805 A | 11/1992 | Mezey | |
| 5,205,698 A | 4/1993 | Mezey | |
| 5,209,537 A | 5/1993 | Smith et al. | |
| RE34,292 E | 6/1993 | Bingman et al. | |
| 5,230,393 A | 7/1993 | Mezey | |
| 5,257,877 A | 11/1993 | Zelinka et al. | |
| 5,266,000 A | 11/1993 | LeBlanc, Jr. | |
| 5,303,841 A | 4/1994 | Mezey | |
| 5,308,211 A | 5/1994 | Bayne | |
| 5,333,984 A | 8/1994 | Bayne et al. | |
| 5,344,272 A | 9/1994 | Nuyts | |
| 5,360,310 A | 11/1994 | Jones et al. | |
| 5,391,039 A | 2/1995 | Holtom | |
| 5,466,110 A | 11/1995 | Redding | |
| 5,470,187 A | 11/1995 | Smith et al. | |
| 5,474,413 A * | 12/1995 | Georg | 414/408 |
| 5,482,180 A | 1/1996 | Smith et al. | |
| 5,484,245 A | 1/1996 | Zopf | |
| 5,505,576 A | 4/1996 | Sizemore et al. | |
| 5,513,942 A | 5/1996 | Pickrell | |
| 5,551,824 A | 9/1996 | Zanzig et al. | |
| 5,562,386 A | 10/1996 | Browning | |

| | | | | | | |
|---|---|---|---|---|---|---|
| 5,601,392 | A | | 2/1997 | Smith et al. | DE | 844 262 | 7/1952 |
| 5,607,277 | A | * | 3/1997 | Zopf ..................... 414/408 | DE | 1226035 | 9/1966 |
| 5,639,201 | A | | 6/1997 | Curotto | DE | 1 236 403 | 3/1967 |
| 5,720,588 | A | | 2/1998 | Graves | DE | 1531763 | 1/1970 |
| 5,720,589 | A | | 2/1998 | Christenson et al. | DE | 2051270 | 4/1971 |
| 5,741,107 | A | * | 4/1998 | Georg ..................... 414/408 | DE | 2 146 653 | 3/1973 |
| 5,755,547 | A | | 5/1998 | Flerchinger et al. | DE | 3 024 081 | 1/1981 |
| 5,769,592 | A | | 6/1998 | Christenson | DE | 39 41 348 A1 * 6/1991 ............ 414/408 |
| 5,775,867 | A | | 7/1998 | Christenson | DK | 82300 | 3/1957 |
| 5,791,861 | A | | 8/1998 | Seelig | EP | 0078011 | 5/1983 |
| 5,797,715 | A | | 8/1998 | Christenson | EP | 0312900 | 4/1989 |
| 5,807,056 | A | | 9/1998 | Osborn et al. | EP | 0405428 | 1/1991 |
| 5,813,824 | A | | 9/1998 | Zanzig et al. | EP | 0 575 867 | 2/1997 |
| 5,826,485 | A | * | 10/1998 | Bayne et al. ............. 414/408 | FR | 2 272 002 | 12/1975 |
| 5,829,944 | A | | 11/1998 | Szinte | FR | 2 459 779 | 1/1981 |
| 5,833,428 | A | | 11/1998 | Szinte | FR | 2 479 783 | 10/1981 |
| 5,853,277 | A | | 12/1998 | Everhart | FR | 2500 425 | 8/1982 |
| 5,890,865 | A | | 4/1999 | Smith et al. | GB | 291 709 | 6/1928 |
| 5,938,393 | A | * | 8/1999 | Georg ..................... 414/408 | GB | 2 078 196 | 1/1982 |
| 5,938,394 | A | | 8/1999 | Christenson | GB | 2 080 757 | 2/1982 |
| 6,059,511 | A | | 5/2000 | Anderson et al. | GB | 2 188 302 | 9/1987 |
| 6,095,744 | A | | 8/2000 | Harrison | SU | 751794 | 7/1980 |
| 6,139,244 | A | * | 10/2000 | VanRaden ............... 414/408 | SU | 1253892 | 8/1986 |
| 6,158,945 | A | | 12/2000 | Anderson et al. | WO | WO 83/03242 | 9/1983 |
| 6,167,795 | B1 | | 1/2001 | Bayne et al. | WO | WO 91/00231 | 1/1991 |
| 6,183,185 | B1 | * | 2/2001 | Zanzig et al. ............ 414/408 | WO | WO 91/05721 | 5/1991 |
| 6,257,372 | B1 | * | 7/2001 | Schirmer ................. 187/269 | WO | WO 92/01612 | 2/1992 |
| 6,293,863 | B1 | | 9/2001 | Carr et al. | WO | WO 93/25457 | 12/1993 |
| 6,325,587 | B1 | * | 12/2001 | Wysocki et al. .......... 414/408 | WO | WO 94/21540 | 9/1994 |
| 6,357,988 | B1 | * | 3/2002 | Bayne ..................... 414/408 | | | |
| 6,413,031 | B1 | | 7/2002 | Yakley et al. | | | |
| 6,439,667 | B1 | | 8/2002 | Weets et al. | | | |
| 6,503,045 | B2 | | 1/2003 | Arrez et al. | | | |
| 6,551,046 | B1 | | 4/2003 | Dorrington | | | |
| 7,273,340 | B2 | | 9/2007 | Arrez | | | |
| 7,390,159 | B2 | | 6/2008 | Rimsa | | | |
| 2001/0046430 | A1 | | 11/2001 | Bayne | | | |
| 2002/0119034 | A1 | | 8/2002 | Arrez et al. | | | |
| 2002/0141854 | A1 | | 10/2002 | Arrez et al. | | | |
| 2002/0141855 | A1 | | 10/2002 | Arrez et al. | | | |
| 2003/0099529 | A1 | | 5/2003 | Arrez et al. | | | |
| 2005/0095096 | A1 | | 5/2005 | Curotto et al. | | | |
| 2005/0095097 | A1 | | 5/2005 | Arrez | | | |

FOREIGN PATENT DOCUMENTS

| | | |
|---|---|---|
| BE | 510235 | 9/1953 |
| CA | 622499 | 6/1961 |
| CH | 358747 | 11/1961 |
| CH | 453203 | 6/1968 |
| DE | 811 456 | 8/1951 |

OTHER PUBLICATIONS

Refuse Removal Systems, Inc. "Waste Wheeler", Waste Age, Mar. 1982, with photographs of the device, Waste Wheeler Nos. B913-B922.

Product listings page of Rubbermade Applied Products, Inc., "Mobile Toter" dated 1962.

Coles P. McKagen, World Wastes, "Supercan! Can . . . and Does", Jun. 1983 pp. 24-26.

Waste Age, "Pezold Hauling Adds and Axle", pp. 31-33 , prior to 2000.

Zarn Model "D" sales brochure, 2 pages, printed prior to Mar. 20, 2002.

Taskmaster Lifter features/specifications from: http://www.baynethinline.com/products-taskmaster.htm, Jul. 12, 2002.

Zoller System for Lifting and Tipping device MGB 12/240 I Brochure from Zoller-Kippmer GMBH, 11 pages, undated.

Bayne "Thinline Grabber Lifter", Model GTLS 1110 Flyer from Bayne Machine Works, Inc., 1 page, undated.

Zarn Model "D" Brochure from Zarn, Inc., 2 pages, undated.

* cited by examiner

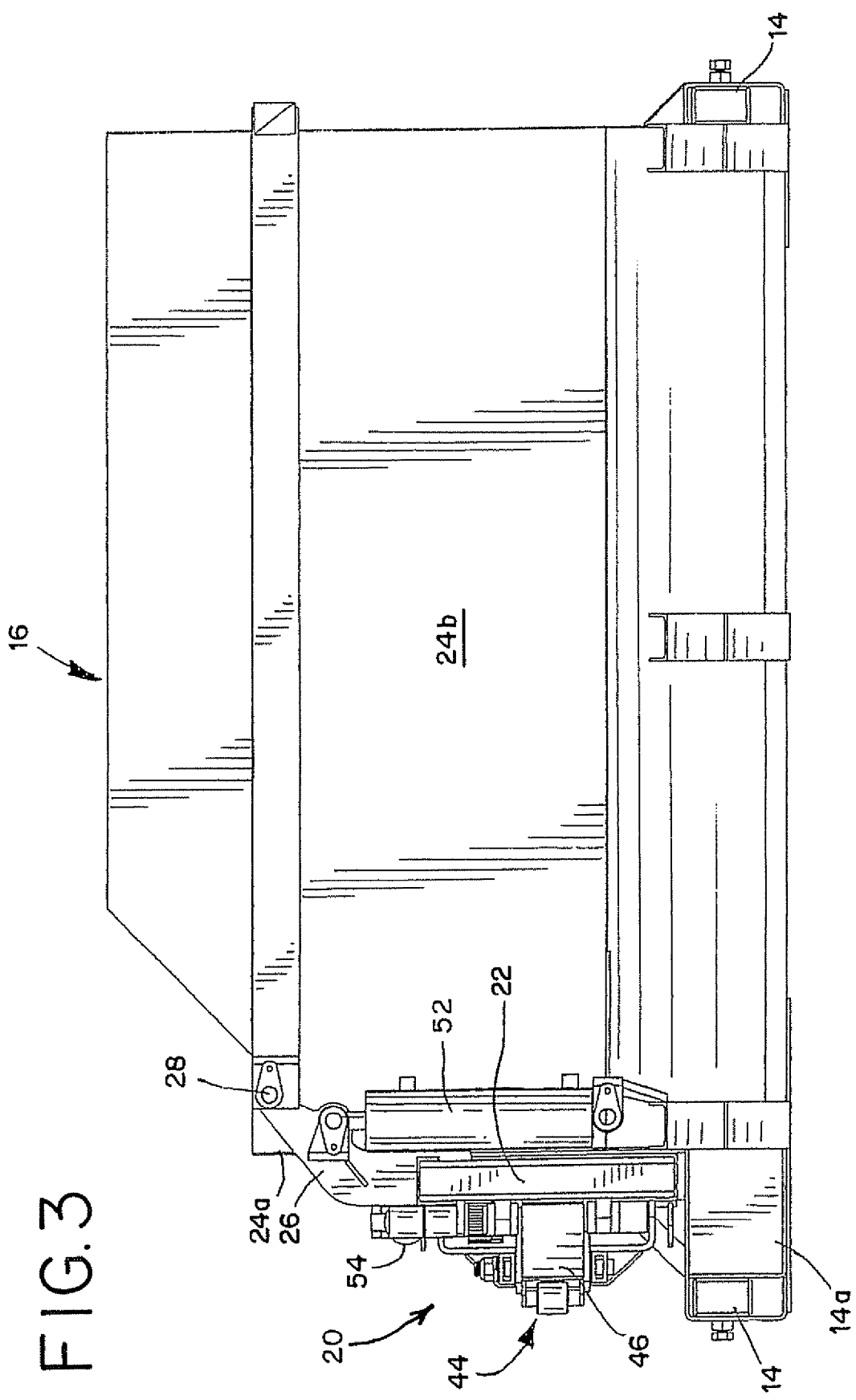

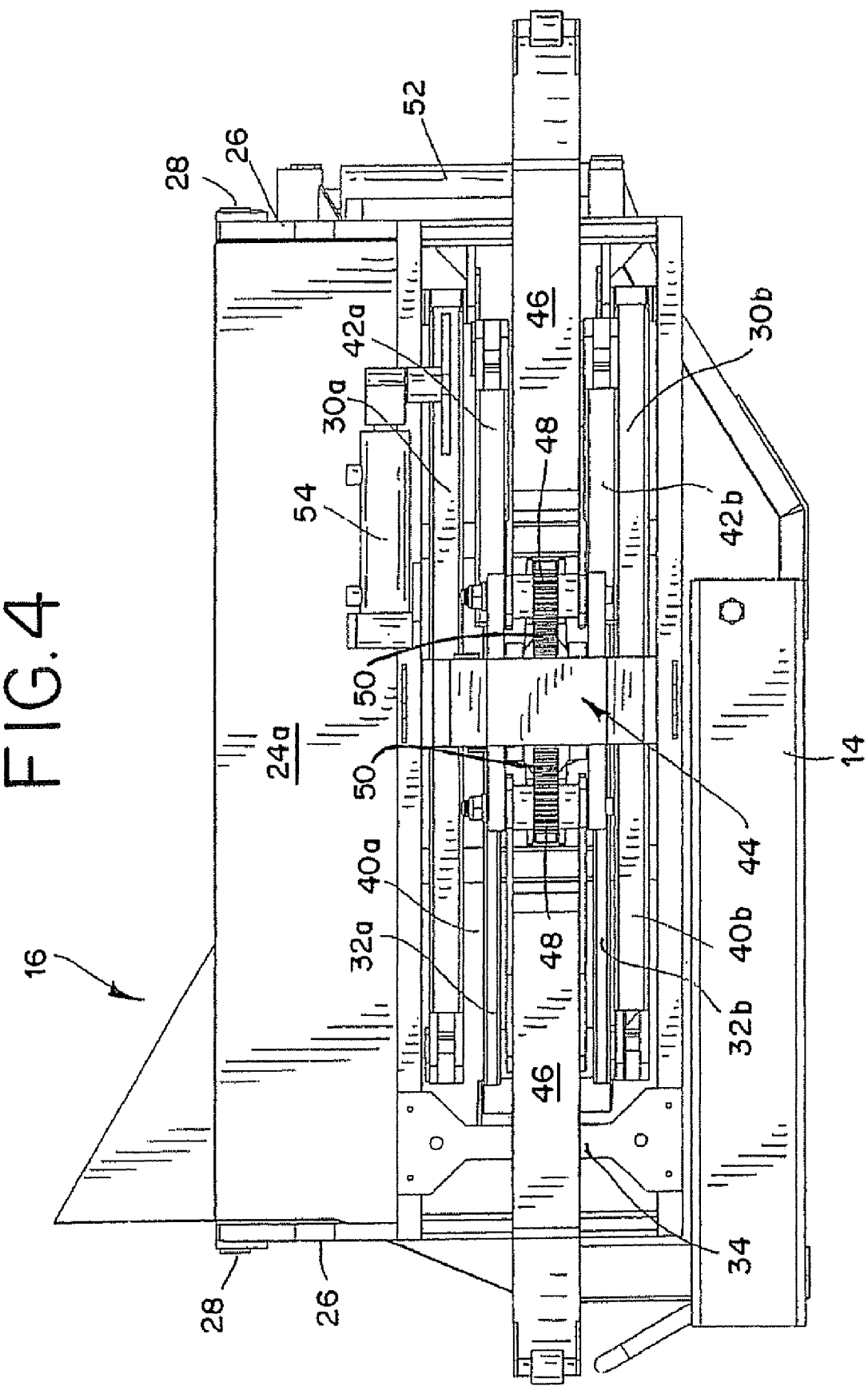

FRONT LOAD CONTAINER LIFTER

CROSS REFERENCE TO RELATED APPLICATIONS

This application claims the benefit of the filing dates of U.S. Provisional Applications Ser. Nos. 60/744,960, filed Apr. 17, 2006 and 60/891,608, filed Feb. 26, 2007, both of which are incorporated by reference herein in their entirety.

FIELD OF INVENTION

The present invention relates to a refuse container or cart lifter. The lifter may be mounted to stationary or mobile container, compacting container, side loading refuse collection vehicle or other type of receptacle. The lifter is adapted to be mounted to a side face of a larger front-load refuse receptacle that is removably mounted to, e.g., a pair of forks that carry the larger refuse collection container in front the refuse collection vehicle, and invert the larger refuse collection container to dump its contents into a body or chamber located rearward of the cab of the vehicle. The lifter is also adapted to be mounted to the side of a refuse collecting vehicle rearward of the cab so that the lifter can dump refuse collection carts directly into the body or chamber located rearward of the cab.

BACKGROUND OF THE INVENTION

Front load refuse collection vehicles are in wide use in large-scale residential refuse collection. A front load refuse collection vehicle typically has a front cab, a large refuse compartment behind the cab, and a pair of hydraulic-powered lift forks extending in front of the truck that are adapted to be inserted into corresponding slots or sleeves associated with an intermediate size portable refuse collection container. The forks are able to lift the refuse container over the front of the truck and invert the container to dump its contents into the refuse compartment or body located behind the cab.

For residential and small-scale refuse collection, the collection container is often carried in front of the collection vehicle as it moves along the street. The contents of smaller residential collection carts are first dumped into the intermediate collection container, and the intermediate container is then inverted to dump its contents into the larger collection bin behind the vehicle cab.

Typically a hydraulic cart lifter is mounted to the intermediate collection container to invert the residential collection cart to dump its contents into the intermediate container. Hydraulic lifters have also been mounted to the intermediate collection container in a manner so that the lifter can be moved into engagement with the residential refuse cart, rather than requiring the operator to move the refuse receptacle to the lifter. U.S. Pat. Nos. 5,484,245; 5,607,277; 5,639,201; 5,797,715; 5,938,394; 6,139,244 and 6,357,988, all of which are hereby incorporated by reference, illustrate such arrangements. These systems, however, have a number of drawbacks, and there continues to be a need for improved systems.

SUMMARY OF THE INVENTION

In accordance with the present invention, a cart lifter is provided that is adapted to be mounted to a refuse container or directly to a refuse collection vehicle. In keeping with an aspect of the invention, a support is provided that is adapted to be pivotally mounted adjacent to the loading area of either the refuse container or the vehicle. First and second support arms are provided that are carried by the pivoting support. Each support arm has a first end that is pivotally associated with the support frame and a second free end. The support arms are pivotally connected to one another at a position intermediate their first and second ends. The support arms are movable relative to the support frame between a first position in which the support arms are adjacent the sidewall of the refuse container and preferably substantially coplanar and a second position in which the support arms are relatively angularly disposed with their free ends being spaced outwardly away from the support frame. A container capturer is provided for engaging and releasing a smaller refuse collection cart, and the free ends of each of the support arms are adapted to carry the container capturer. Actuators are provided for pivoting the support frame relative to the container or vehicle (to dump or invert the refuse collection cart), to move the support arms between the first position, adjacent for storage and/or dumping and the second position for capturing or releasing a cart, and an actuator for actuating the container capturer so that it can engage and release the refuse collection cart.

In another aspect, the actuator for pivoting the support frame relative to the container or vehicle may comprise a single actuator at one end of the support frame, a single actuator in an intermediate portion of the support frame, or a pair of actuators, one at each end of the support frame.

Additionally, the support arms may be pivotally connected to the support frame so that the first end of one of the support arms is fixed with respect to the frame, while the first end of the other support arm is slidable along the support frame. Alternatively, the first ends of both support arms may be pivotally attached to the support frame about fixed points and the pivotal connection between the support arms is a sliding pivot.

In another aspect to the invention, a cart lifter is provided that comprises a mounting plate that is pivotally attached to the refuse collection container or vehicle. An actuator is provided for pivoting the mounting plate with respect to the refuse collection container or vehicle. A pair of first support arms is pivotally attached to the mounting plate, with each first support arm having a second support arm pivotally mounted to its free end. A cart grabber for selectively engaging and releasing a smaller refuse collection cart is mounted to the free ends of the second support arms, and a second actuator is provided for moving the grabber mechanism between the engagement and release positions. A connecting arm is provided that is pivotally connected to each of the second support arms intermediate the pivoting connections with the first support arms and the cart grabber, with a link arm pivotally connected between the mounting plate and the connecting arm. A third actuator is pivotally connected to the mounting plate and one of the first support arms for moving the support arms between a first position adjacent the container or vehicle and a second position spaced from the container or vehicle.

Other features of the "invention" will become apparent upon reference to the accompanying drawings and detailed description.

BRIEF DESCRIPTION OF THE FIGURES OF THE DRAWINGS

FIG. 3 is a side view of the container lifter of FIG. 1 looking toward the front of the front front-load refuse receptacle.

FIG. 4 is a front view of the container lifter of FIG. 1 as seen looking toward a lateral side wall of the front-load refuse receptacle.

FIGS. 19-24 illustrate a further embodiment of a cart lifter, with FIGS. 19, 21 and 23 showing the lifter in its retracted position adjacent the lateral side wall of the larger refuse collection container, while FIGS. 20, 22 and 24 show the lifter in its extended position.

DETAILED DESCRIPTION

Figure 1:
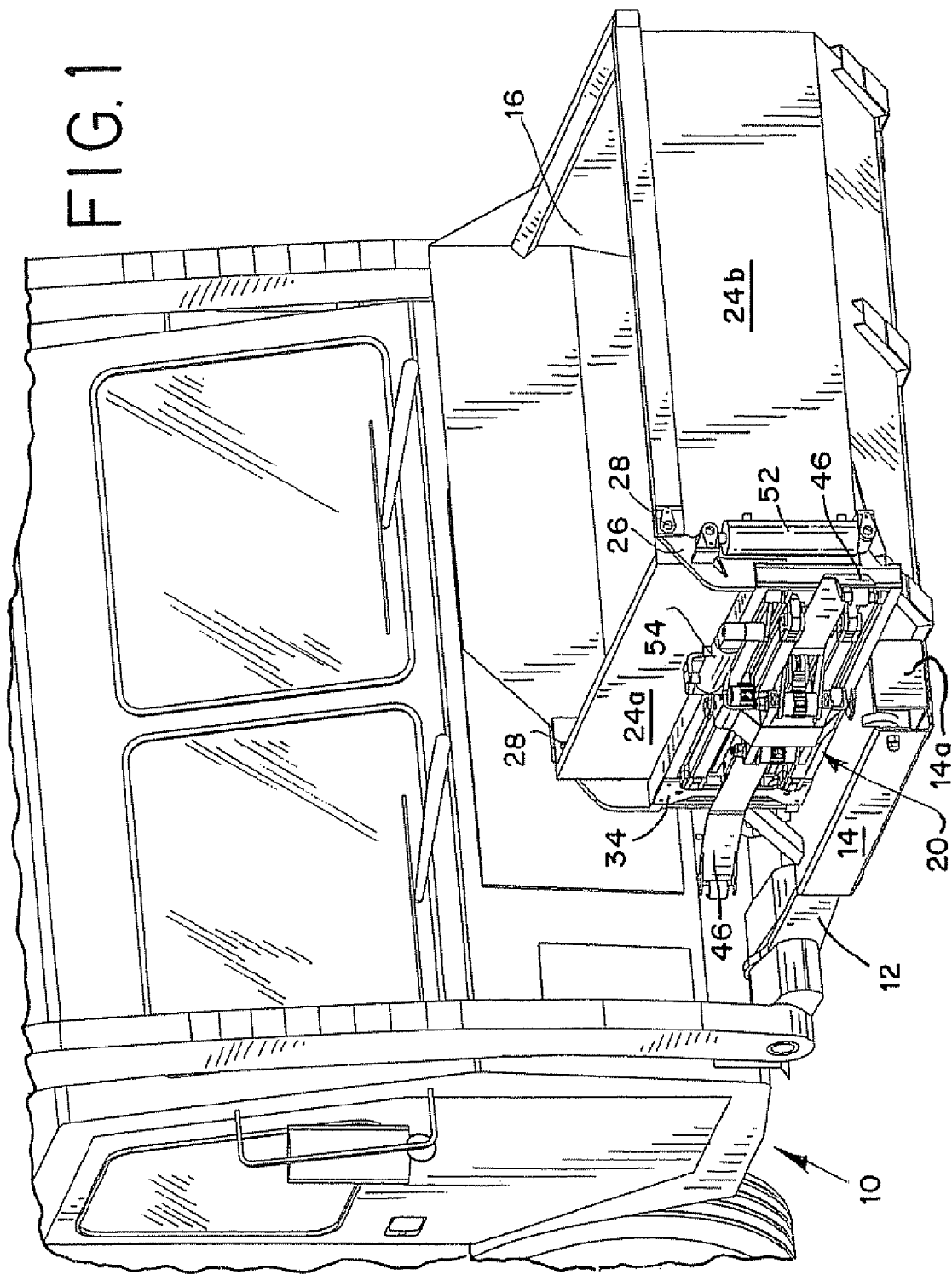
FIG. 1 is a fragmentary perspective view showing a larger front-load refuse receptacle carried by a refuse collection vehicle, with a cart lifter according to a first embodiment of the present invention mounted to the side of the front-load refuse receptacle.
Figure 2:
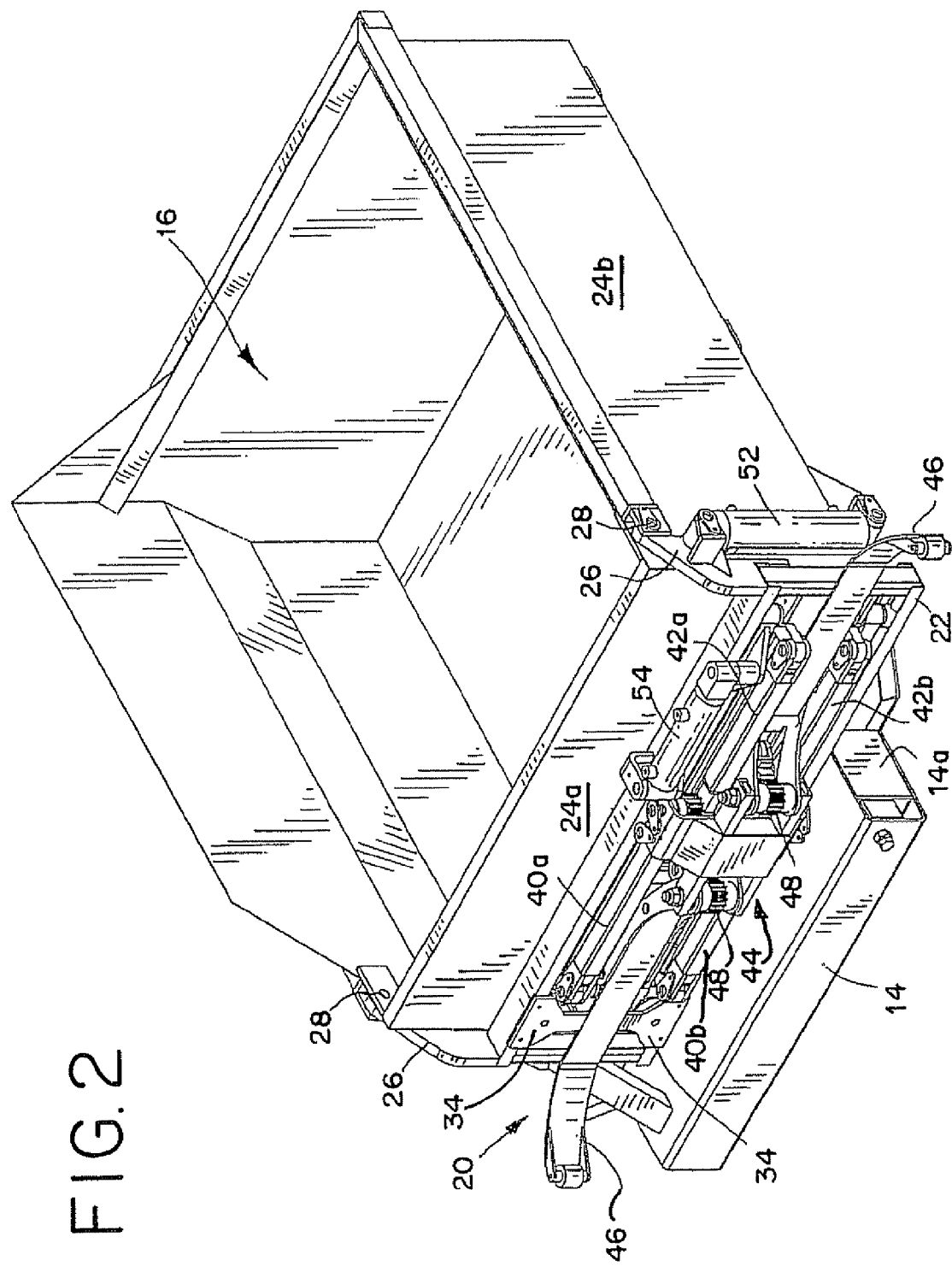
FIG. 2 is an enlarged perspective view of the front-load refuse receptacle and the cart lifter associated therewith shown in FIG. 1.

Front load refuse collection vehicles are in wide-spread use in large-scale residential refuse collection. With reference to FIG. 1, a front load refuse collection vehicle typically has a front cab 10 with a large refuse compartment behind the cab (not shown). A pair of hydraulic-powered lift forks 12 extend in front of the truck that are adapted to be inserted into corresponding slots or sleeves associated with an intermediate-size portable refuse collection container, generally designated 16. The forks 12 are able to lift the refuse container 16 over the cab of the truck and invert the container 16 to dump its contents into the refuse compartment or body located behind the cab 10.

For residential and small-scale refuse collection, the collection container is often carried in front of the collection vehicle as it moves along the street. The smaller residential collection carts (such as cart 18 in FIGS. 6-10) are first dumped by cart lifters mounted to the intermediate collection container 16 into the container 16 before the larger container is inverted to dump its contents into the larger collection bin of the vehicle.

As shown in the drawings, the intermediate refuse collection container typically includes sleeves or channels 14 for receiving the lift forks associated with the refuse collection vehicle. Preferably, one of the sleeves 14 contains a modular housing 14a for containing the hydraulic and electronic systems associated with the cart lifter and providing ready repair and replacement of same.

In keeping with the invention, a container lifter is provided that is adapted to be mounted to the side wall of the intermediate refuse collection container. The lifter comprises a support that is pivotally mounted to the intermediate refuse container adjacent to the loading area of the refuse container so that the support is movable between a first position adjacent the side wall of the refuse container and a second position angularly disposed with respect to the container side wall for inverting and dumping a residential collection cart. First and second support arms are provided that are carried by the pivoting support. Each support arm has a first end that is pivotally associated with the support frame and a second, free end. The support arms are pivotally connected to each other at a position intermediate their first and second ends and are movable relative to the support frame between a first position, in which the support arms are adjacent the sidewall of the refuse container and are preferably substantially coplanar, and a second position in which the support arms have their free ends spaced outwardly away from the support frame. The free ends of the support arms support a container capturer for engaging and releasing a residential refuse collection cart, and actuators are provided for pivoting the support frame relative to the container vehicle, to move the support arms between the first and second positions, and to actuate the container capturer for engaging and releasing the refuse collection car.

Turning again to FIG. 1, a first embodiment of the present invention, is shown in which a cart lifter, generally designated 20, is provided that comprises a support in the form of generally rectangular open frame 22 that is pivotally mounted to a lateral sidewall 24a of the intermediate refuse collection container adjacent the top edge thereof. The lifter 20 may alternatively be pivotally mounted to the front wall 24b of the intermediate refuse collection container 16 without departing from the present invention, although mounting to the side wall is preferred for residential pickup. Similarly, the container lifter 20 of the present invention can also be pivotally mounted to a stationary container or compactor. As shown, the illustrated frame 22 has a pair of mounting brackets or ears 26 by which it is pivotally mounted to the refuse collection container. The pivot mounting 28 for the ears may be on the front and rear sidewalls of the intermediate container (as shown in FIGS. 1-4), or on the lateral side wall.

Figure 5A:
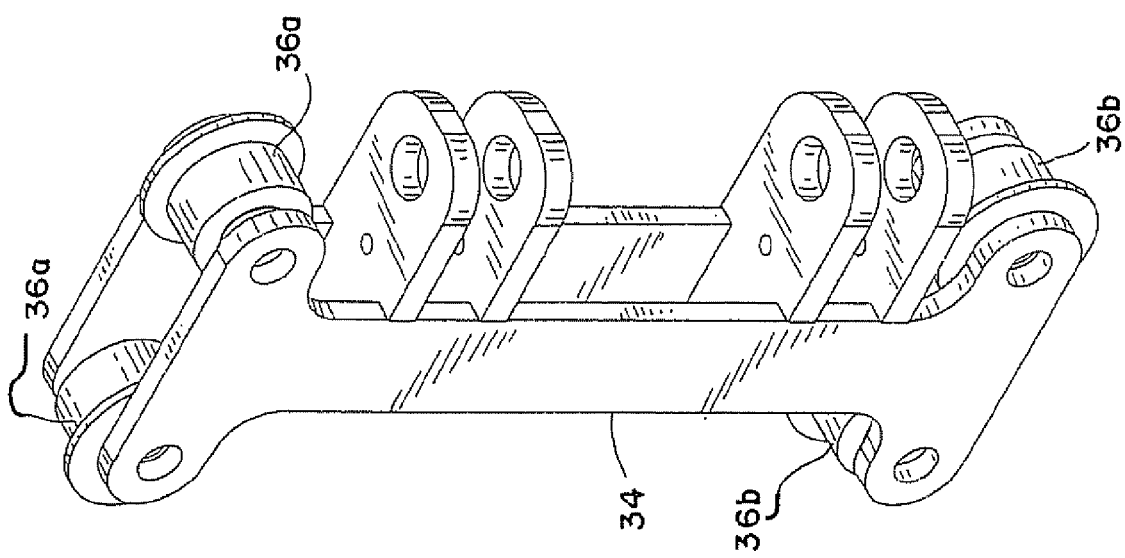
FIGS. 5 and 5a are enlarged views of alternate embodiments for a slidable support arm that forms a part of the embodiment of the cart lifter shown in FIG. 1.
Figure 5:
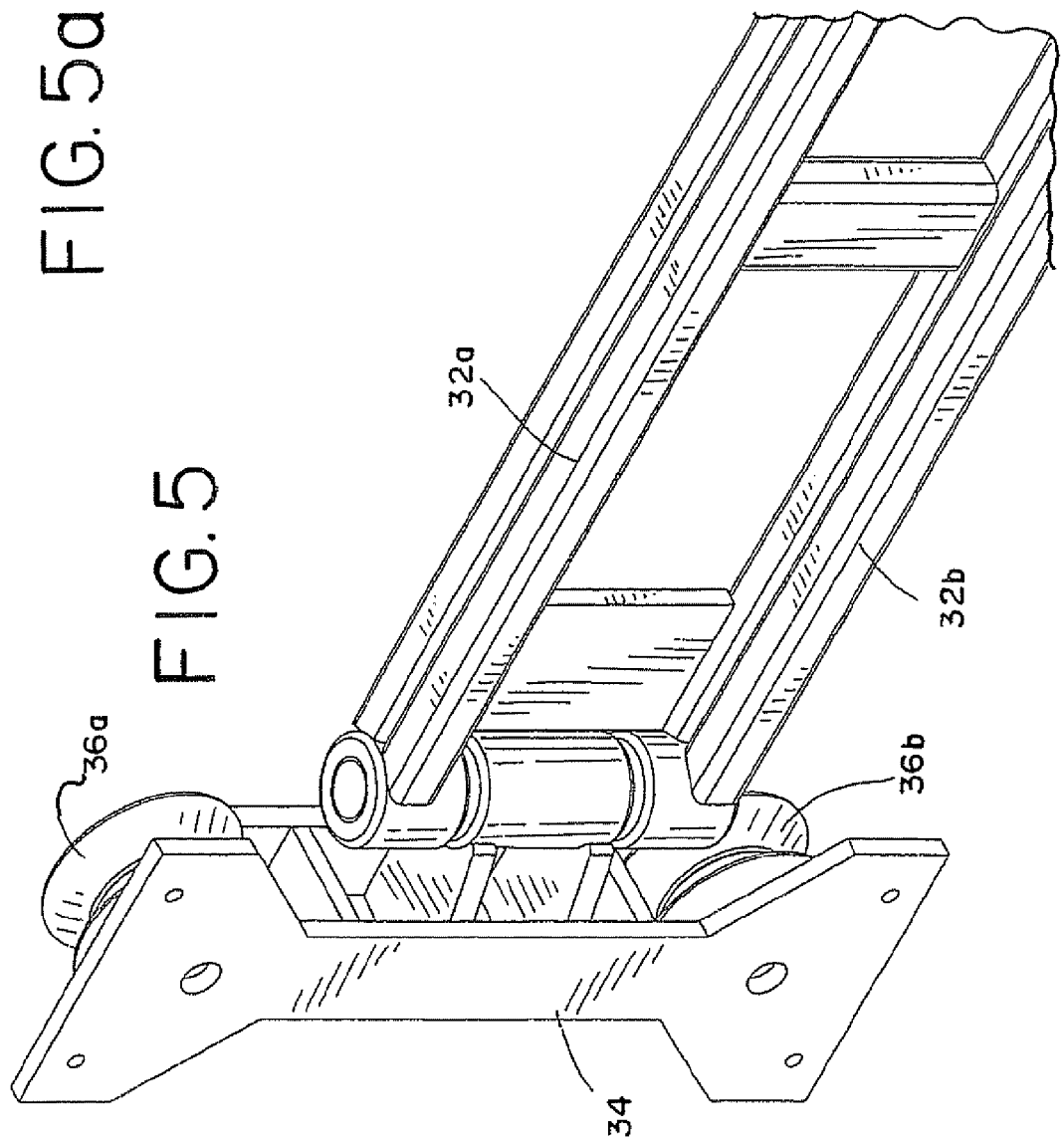
Figure 7:
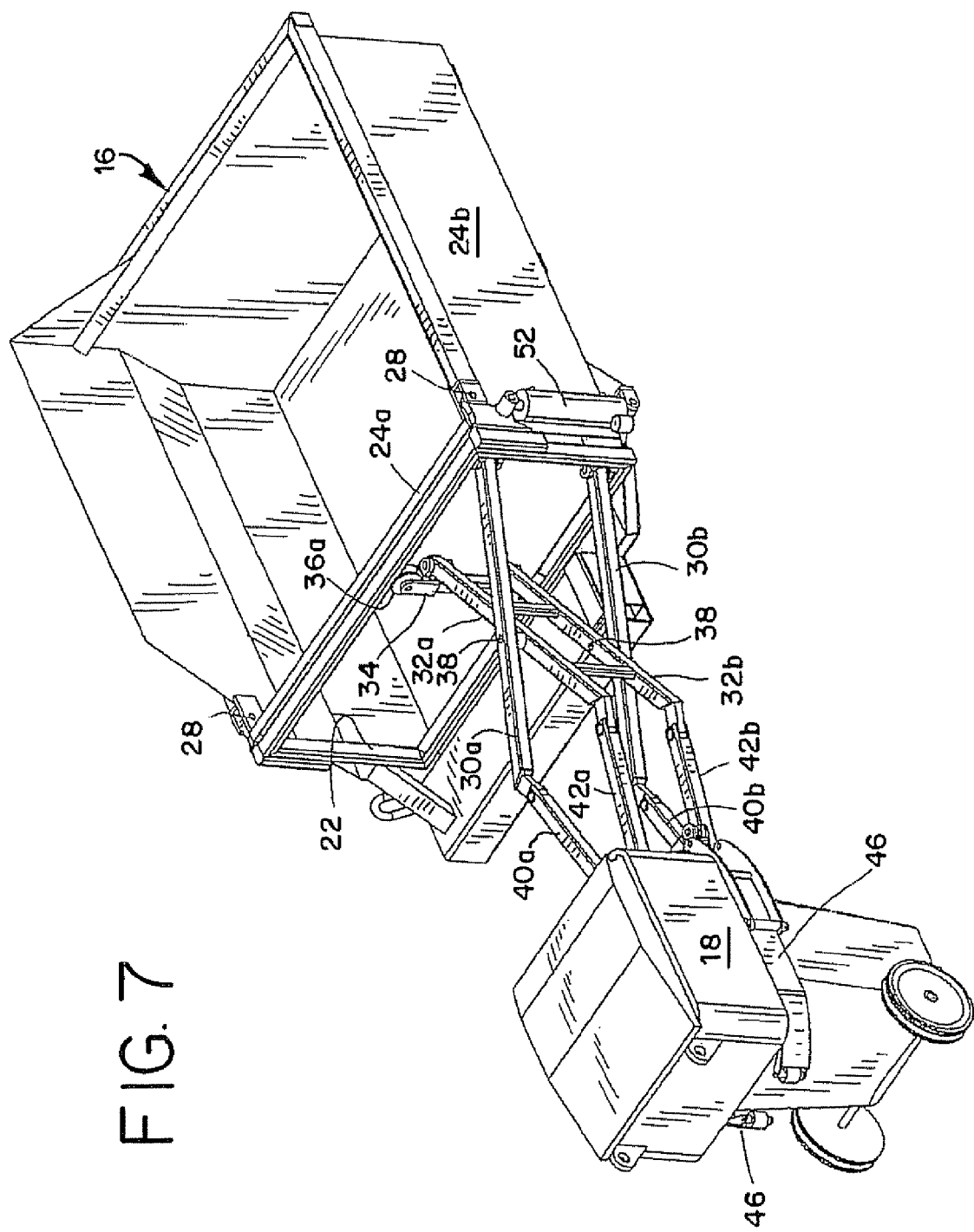
Figure 8:
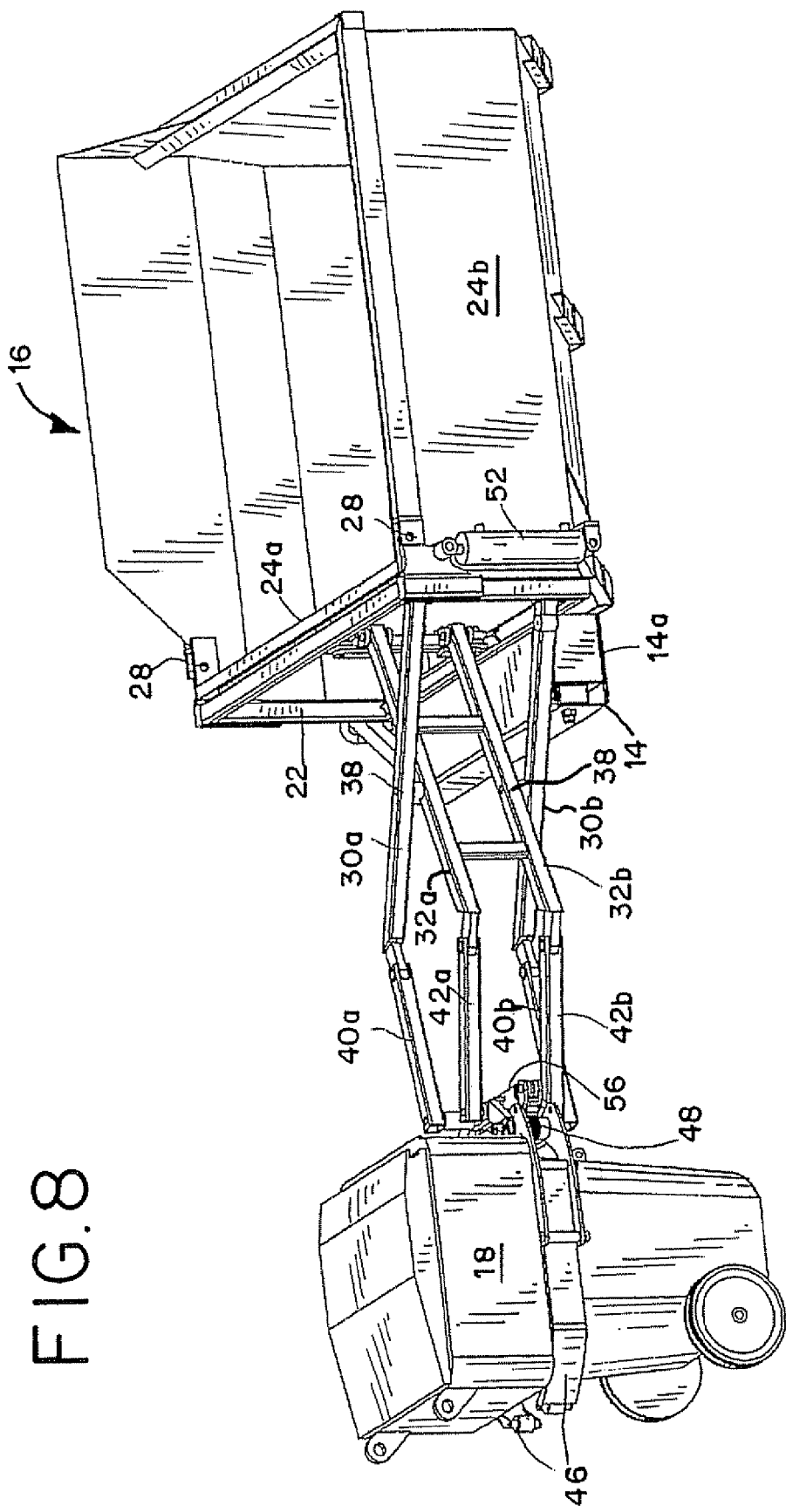
Figure 18:
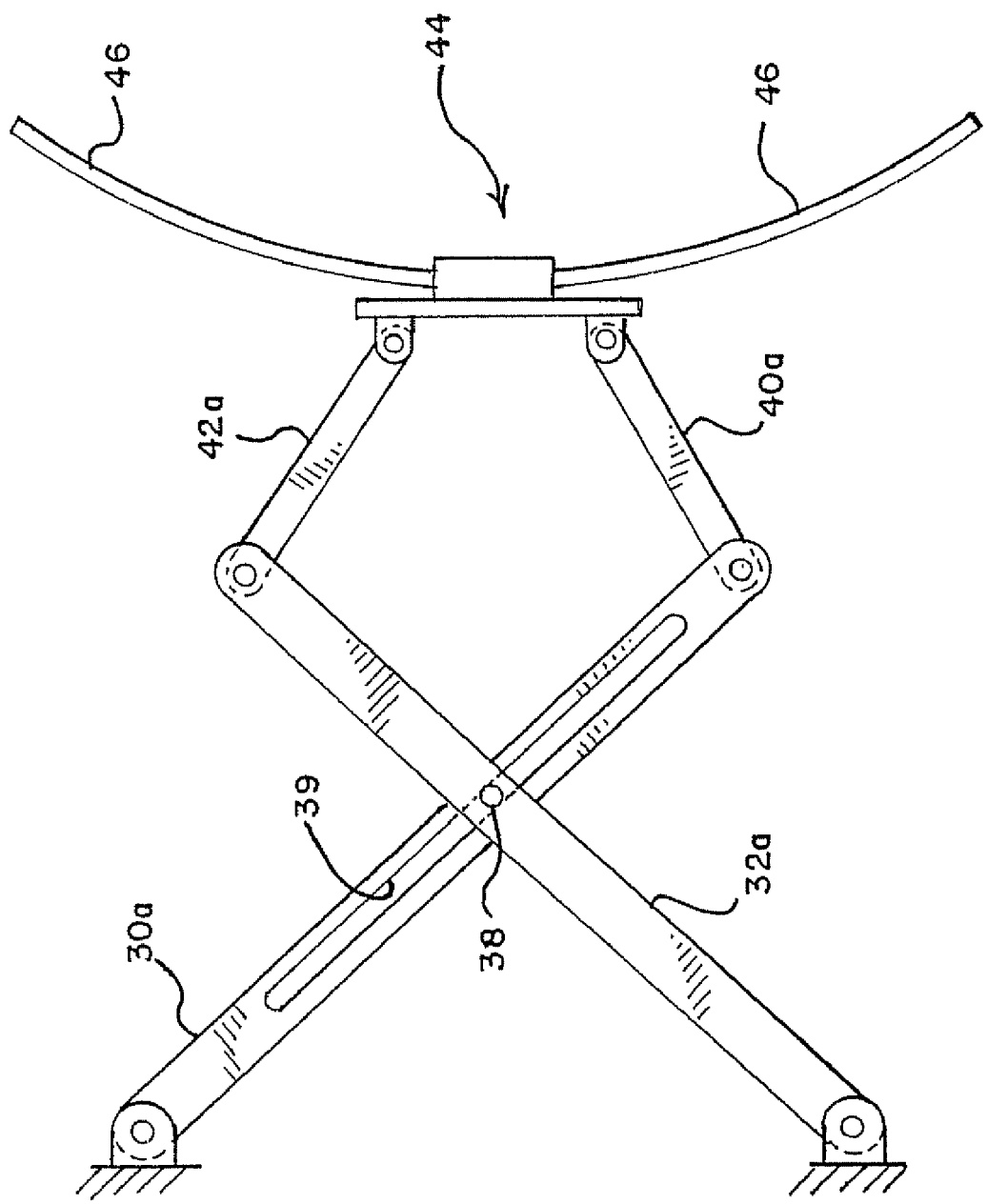
FIG. 18 is a top view of an alternative embodiment for the cart lifter of the present invention.
Figure 19:
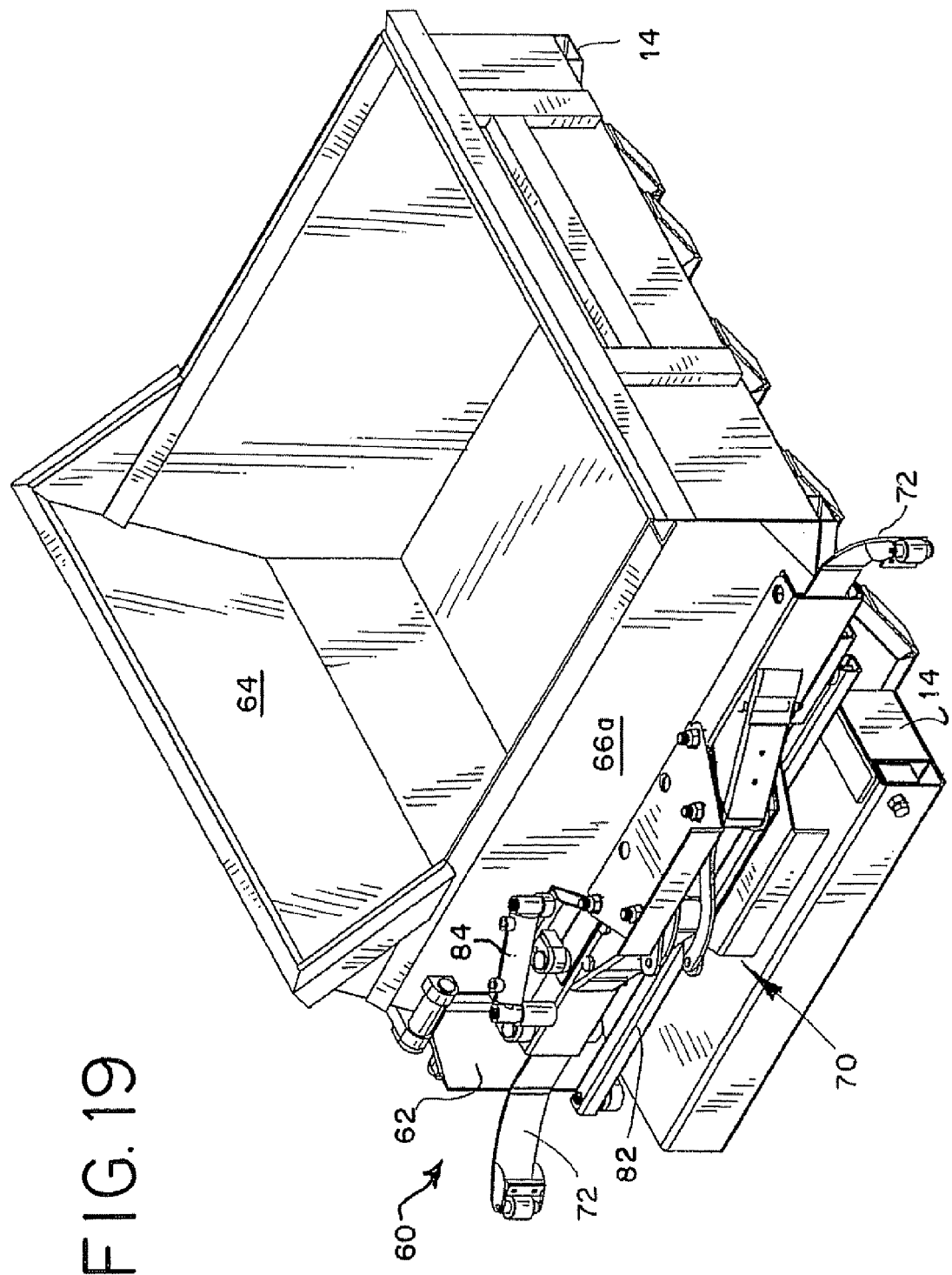
Figure 20:
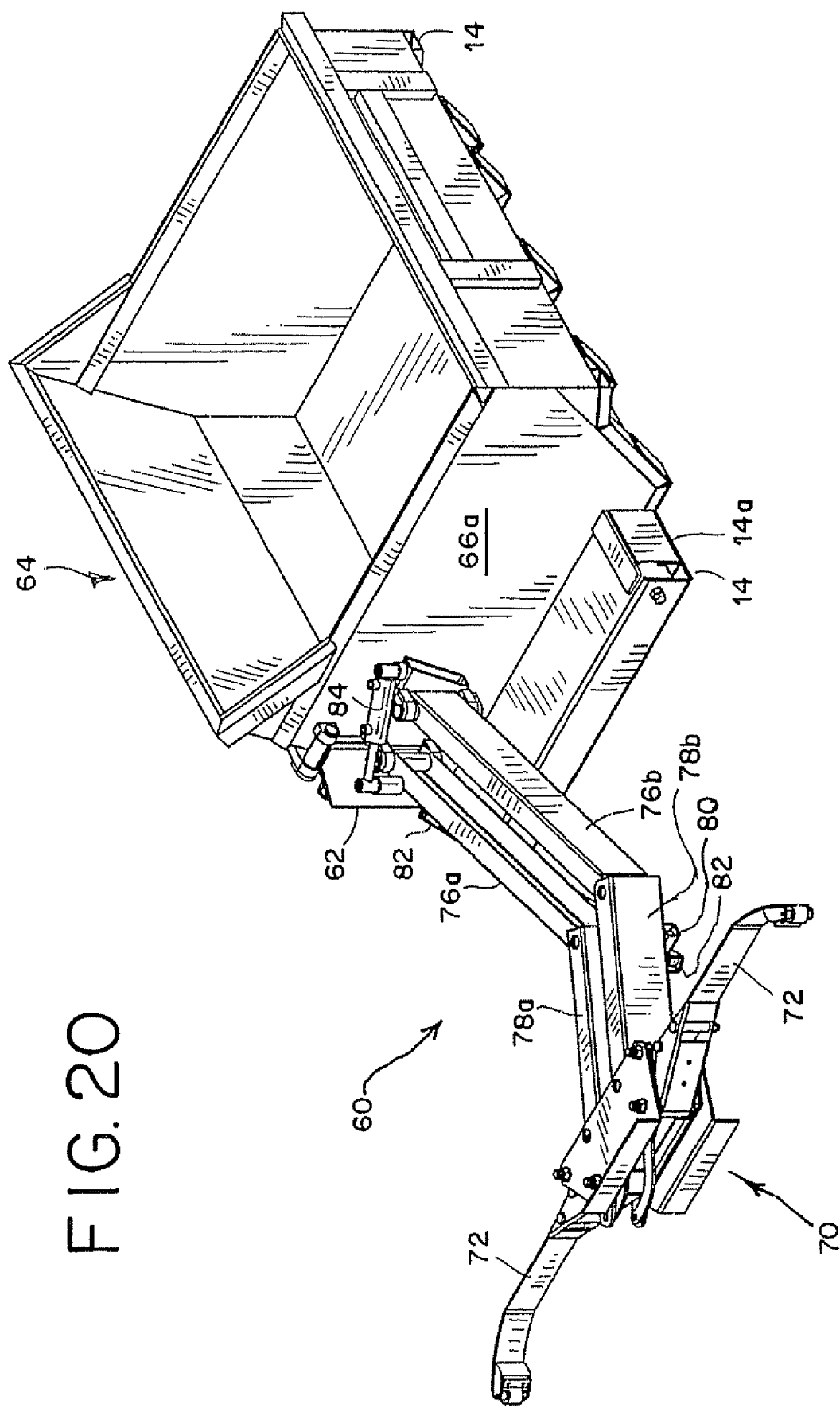
Figure 21:
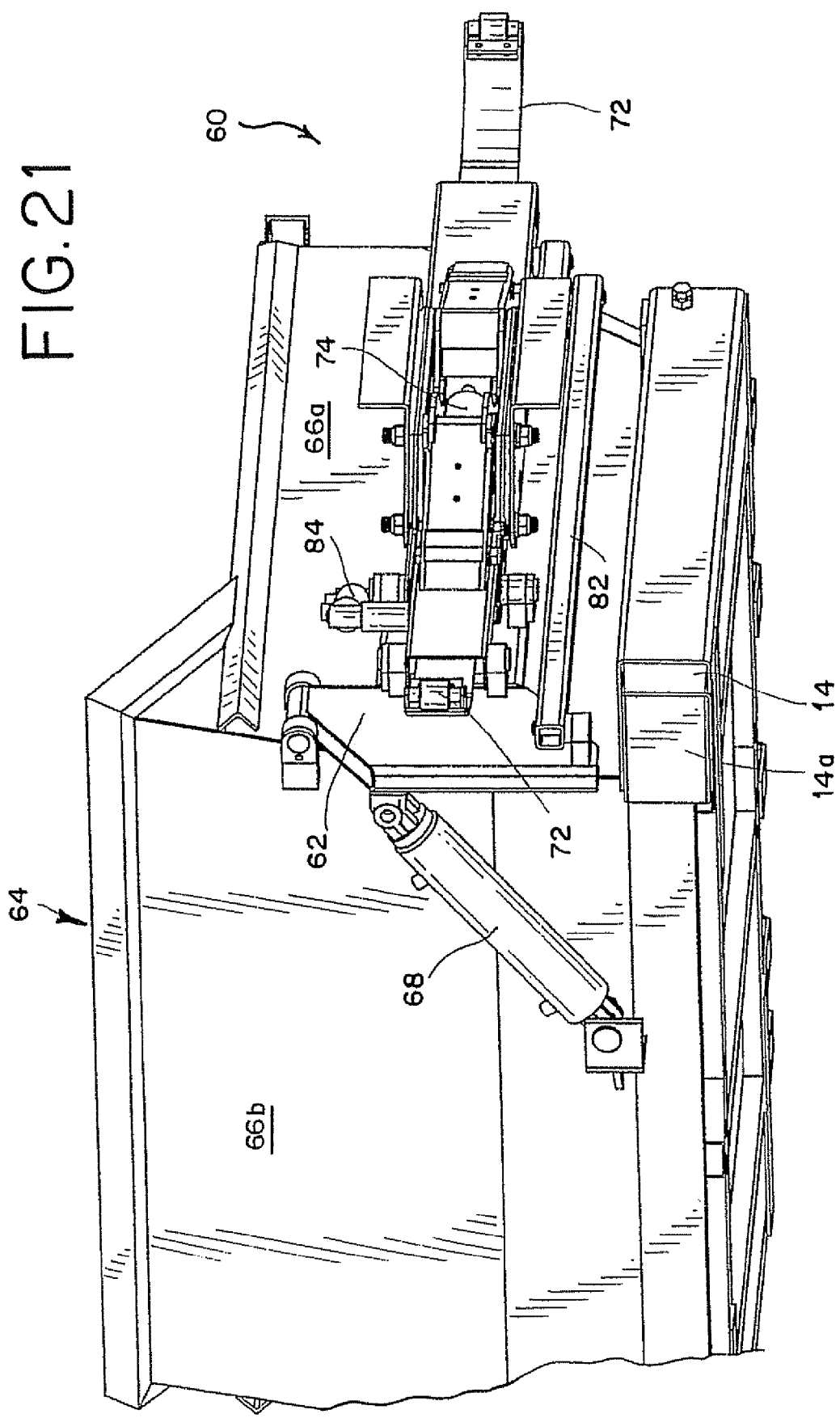
Figure 22:
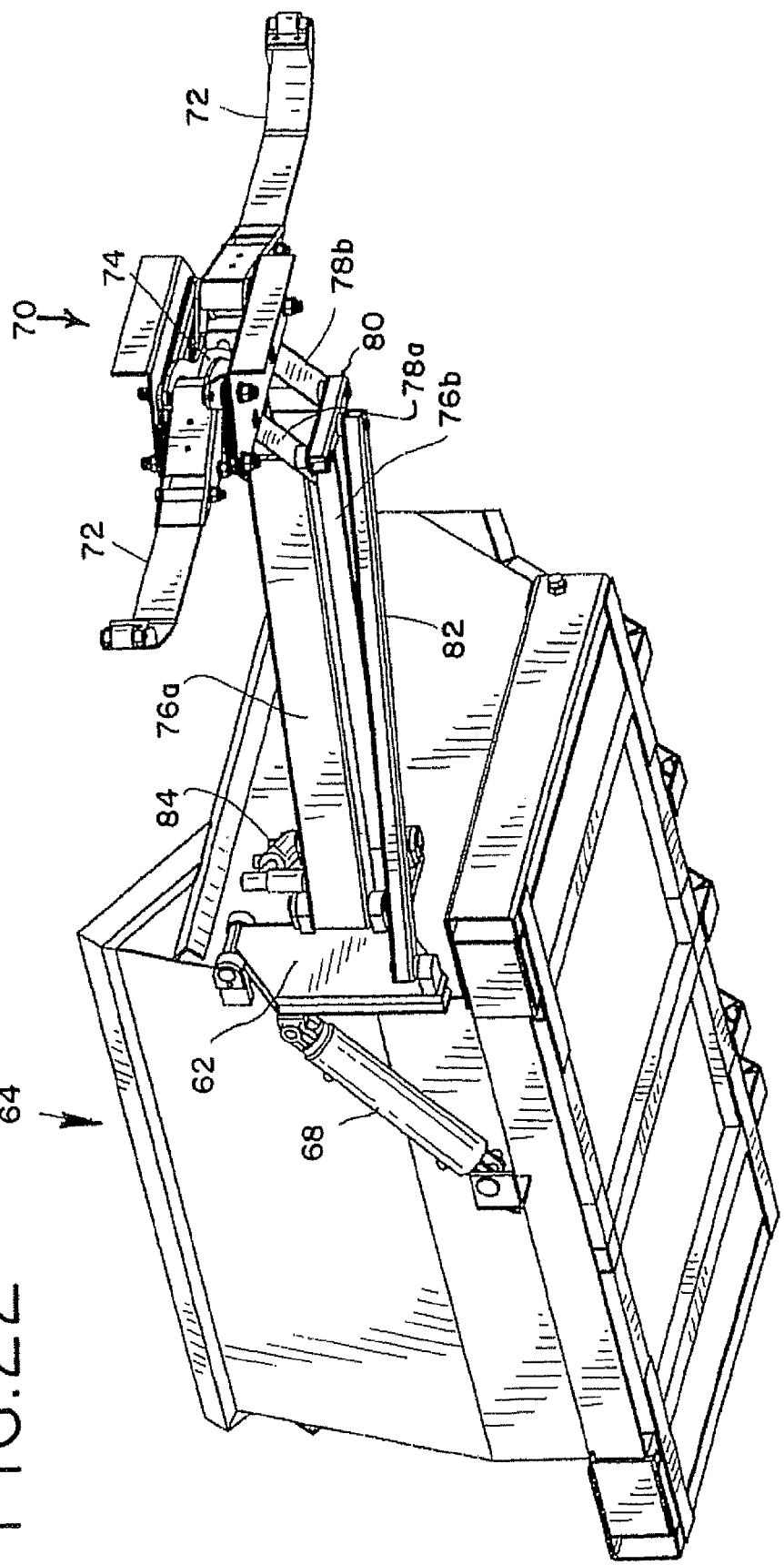
Figure 23:
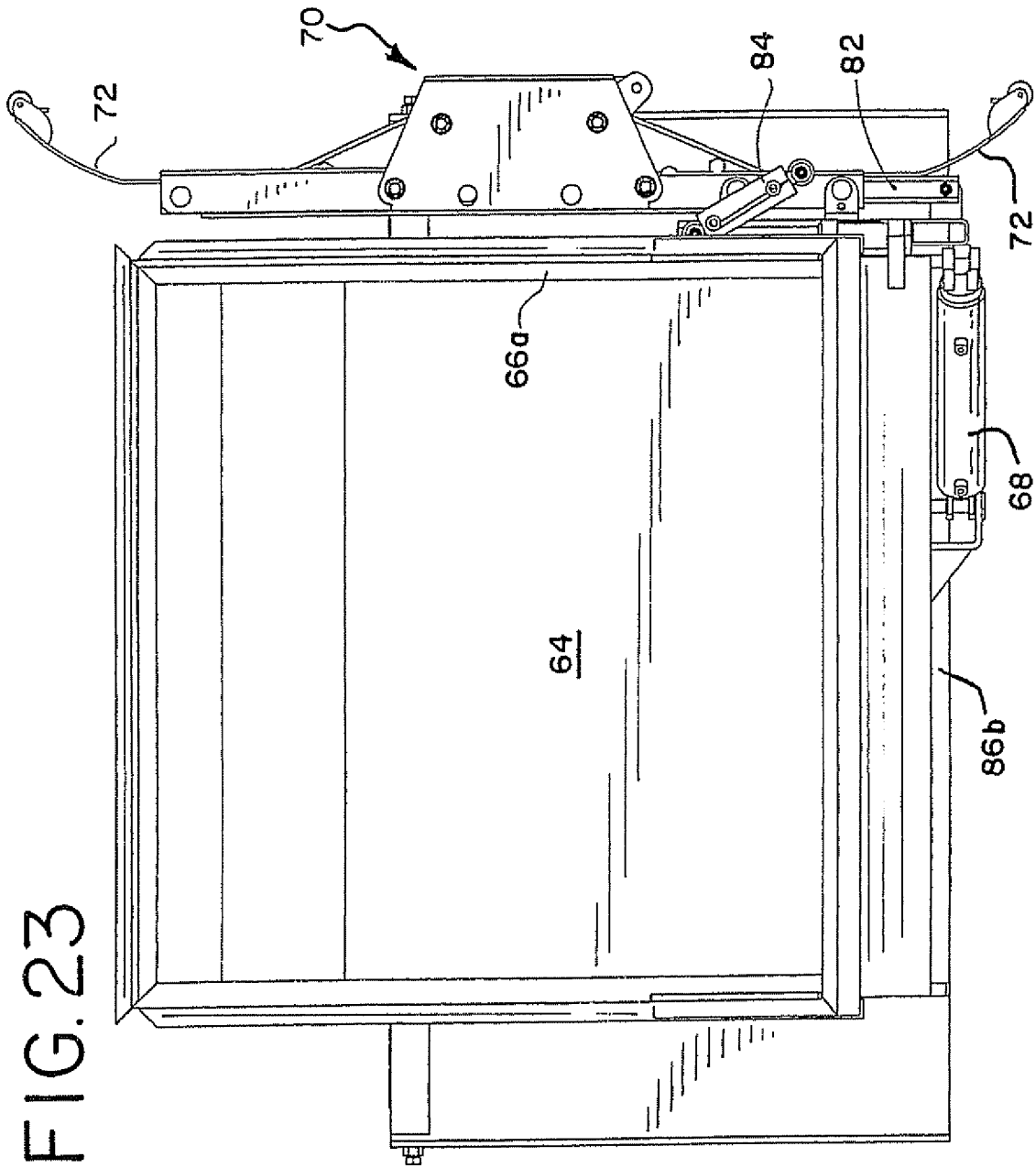
Figure 24:
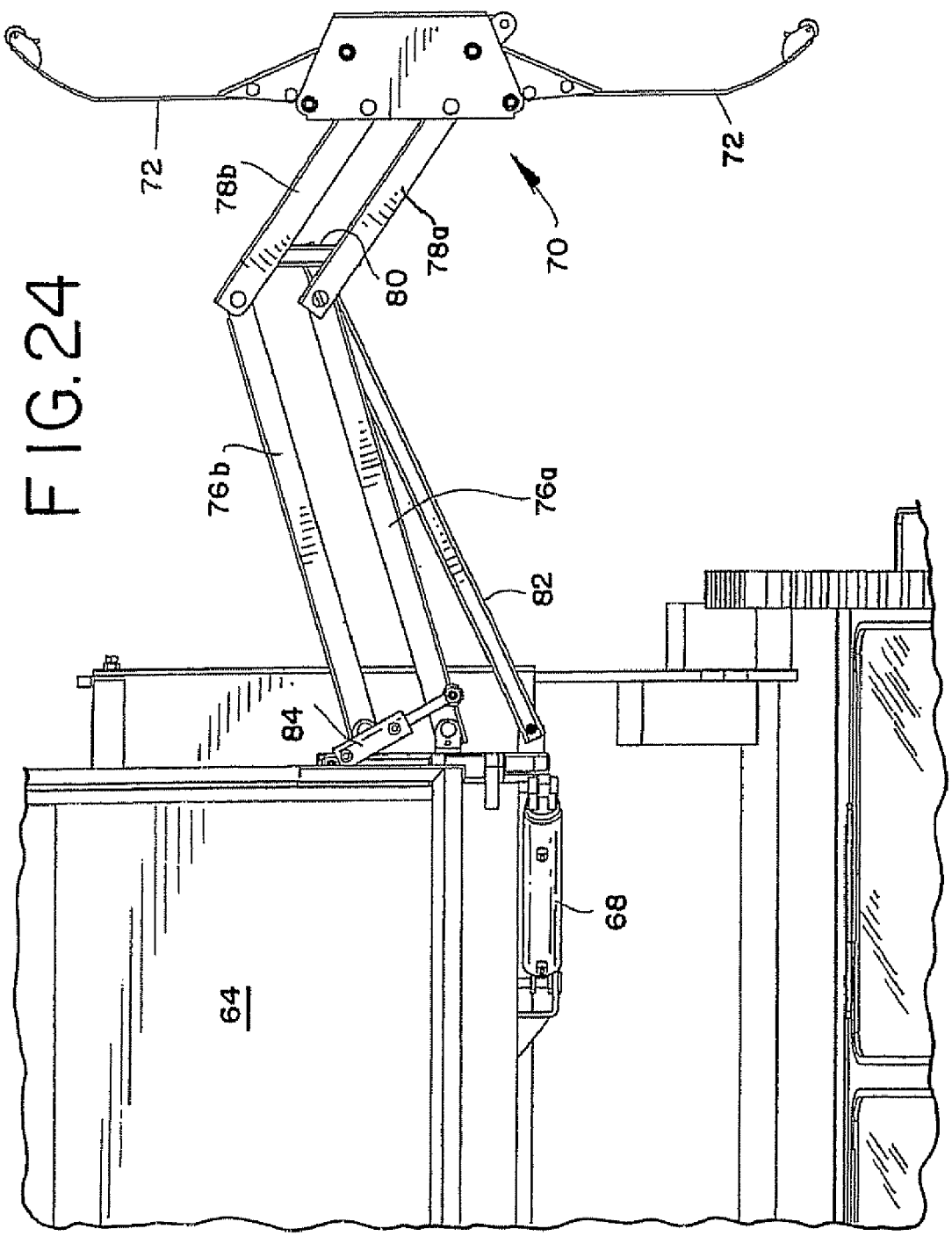

As most clearly seen in FIGS. 7 and 8, at least one and preferably two or more support arms 30a, 30b (the "first pair") are pivotally mounted or attached to the one end (e.g. forward end) of the frame 22. At least one and preferably two or more other support arms 32a, 32b (the "second pair") are pivotally mounted to a vertical support beam 34 that is slidably mounted to the frame 22 by way of a pair of rollers 36a, 36b that seat on the upper and lower horizontal members of frame 22. Thus, the horizontal members of the frame 22 form a track on which the vertical support beam 34 is slidably mounted. The slidable support beam 34 may be constructed in a variety of ways, and in the illustrated embodiments is shown with either two rollers (as shown in FIG. 5) or four rollers (as shown in FIG. 5a). The first pair of support arms 30a, 30b and the second pair of support arms 32a, 32b are also attached to each other by a pivot pin 38 located intermediate the ends of the support arms. Although illustrated with ends of arms 30a and 30b attached at fixed pivot points and the ends of arms 32a and 32b attached to the movable beam, other variations would be apparent to one skilled in the art. For example, the ends of both pairs of arms could be at fixed pivot points or both could be at slidable pivot points. More specifically, both the first pair of support arms 30a, 30b and the second pair of support arms 32a, 32b can be pivotally attached to the frame at their first ends, with one of the pair of support arms having an intermediate slot 39 that slidingly receives the pivot pin 38 located on an intermediate portion of the other pair of support arms, as schematically illustrated in FIG. 18.

The first and second pairs of support arms are movable with respect to the frame 22 from a first position (in which the first and second support arms preferably are substantially coplanar with the frame and nest within or between one another so as to lie substantially flush along the side wall of the refuse collection container, best seen in FIGS. 1-4 and 6), to a second position (in which the free ends of the support arms extend away from the side wall, best seen in FIGS. 7 and 8). The distal or free ends of each of the first and second pair of support arms have, in turn, a further arm member 40a, 40b and 42a, 42b pivotally secured thereto.

A mechanism for selectively engaging and releasing a refuse collection cart (i.e., broadly, a "container capturer"), generally designated 44, is secured to the distal or free ends of the further arm members 40a, 40b and 42a, 42b. As illustrated, the container capturer 44 includes a pair of grabber arms 46 that are movable between a first position, in which they cooperate to capture a refuse collection cart, and a second position, in which a residential-size refuse collection cart is released. To this end, each grabber arm 46 includes a pinion gear 48 at its pivot point that is engaged by a slidable gear rack 50. Movement of the gear rack is controlled by a hydraulic cylinder on the back side of the rack and not readily visible in the drawings. However, other mechanisms for moving the grabber arms 46 may also be used. See, e.g., Published U.S. Pat. Appln. 2005/0095097, (U.S. Ser. No. 10/691,989), incorporated herein by reference. In addition, other lifter mechanisms well known in the art for selectively engaging and releasing a residential-size refuse collection carts may also be used, such as lifter mechanisms employing upper and lower hooks for engaging the bars on the collection cart. See e.g., U.S. Pat. Nos. 6,929,441 and 4,773,812 which are also incorporated herein by reference.

Figure 11:
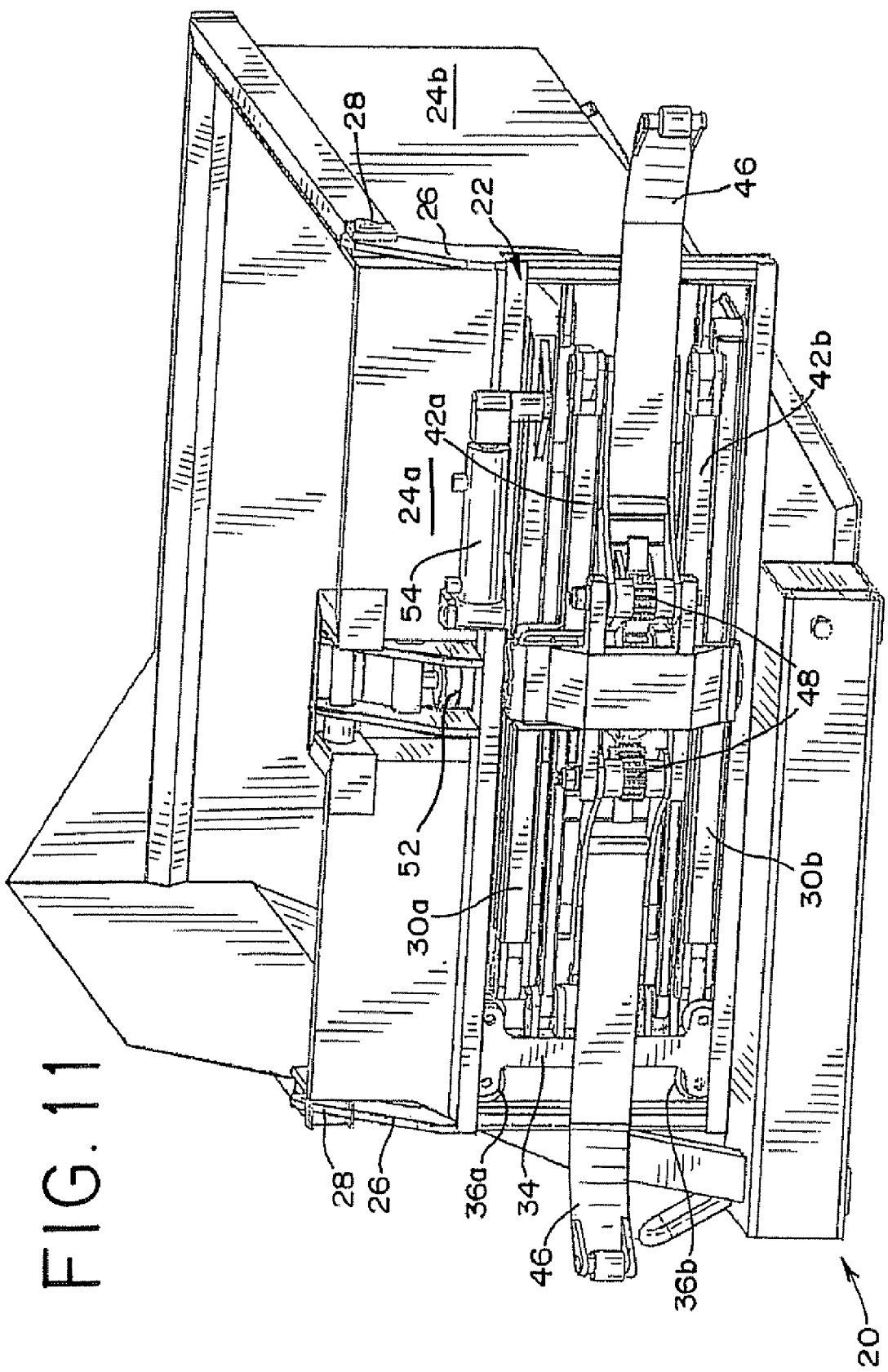
FIGS. 11 and 12 are perspective and top views, respectively, of an alternative configuration for the cart lifter of the present invention.
Figure 12:
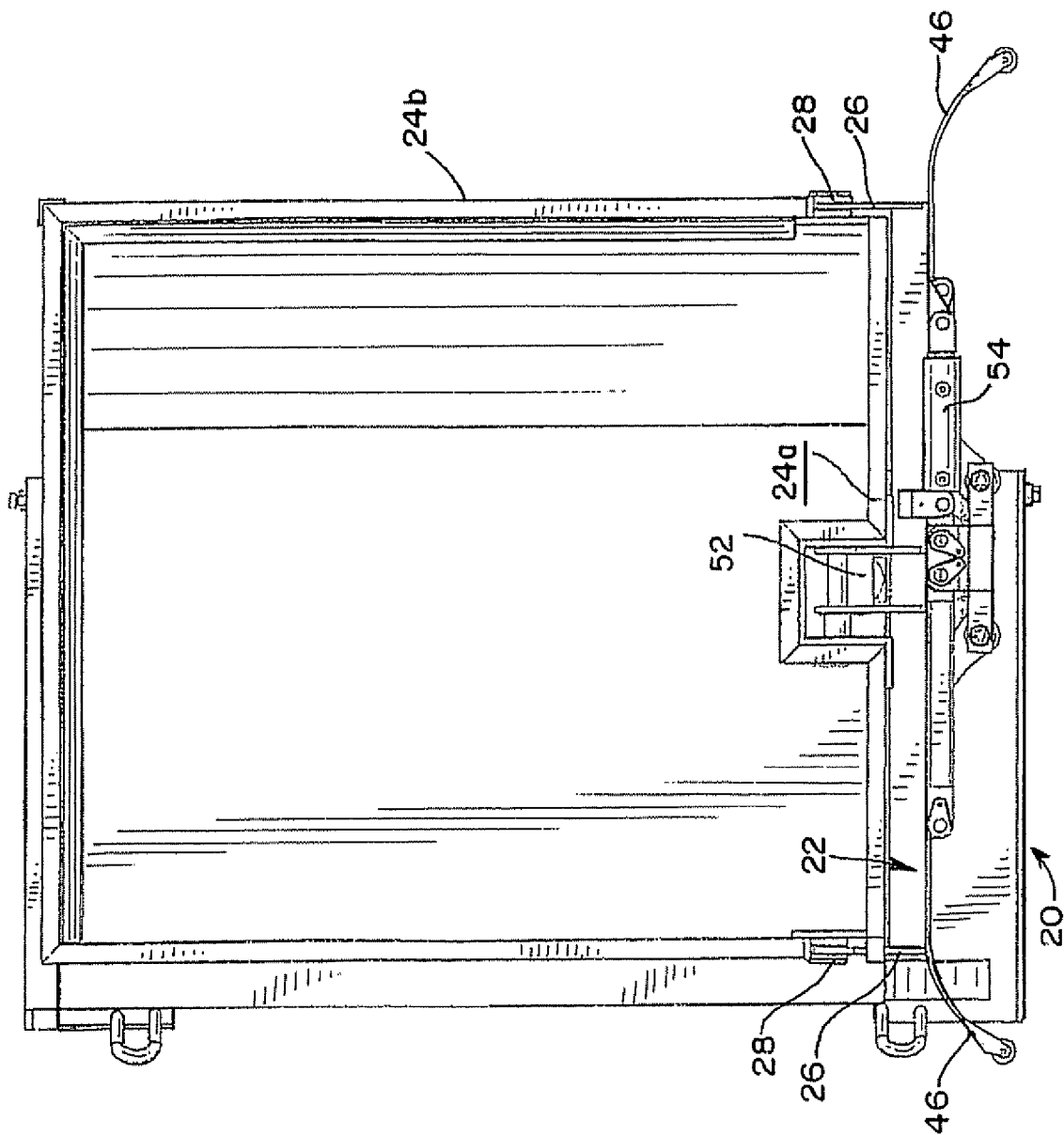
Figure 13:
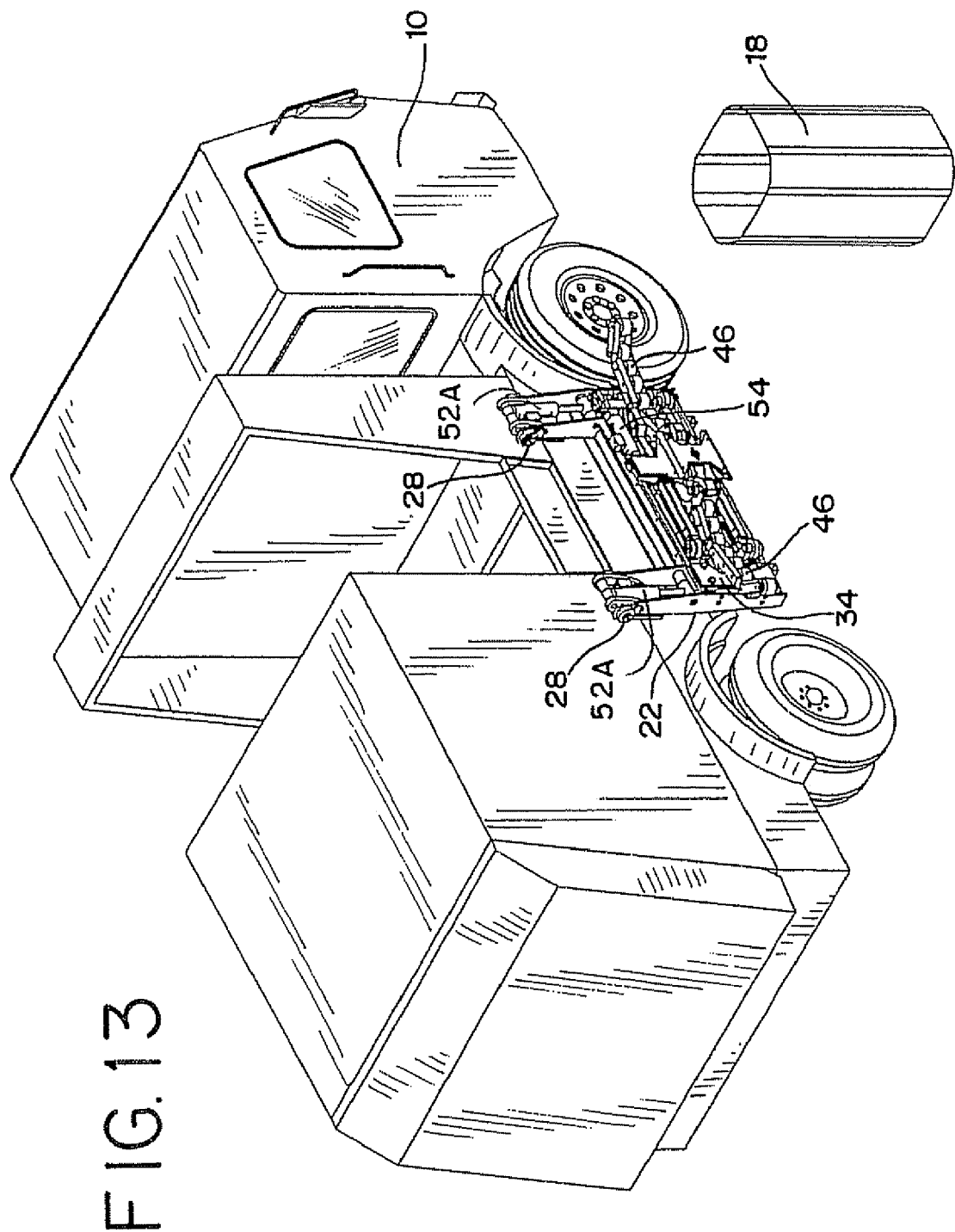
FIGS. 13-17 are perspective views of the refuse collection vehicle and side-mounted cart lifter in accordance with the present invention showing, in sequence, the operation of the lifter to extend (FIG. 14), grab a refuse collection cart (FIGS. 15), retract (FIG. 16) and invert the cart to dump its contents (FIG. 17).
Figure 14:
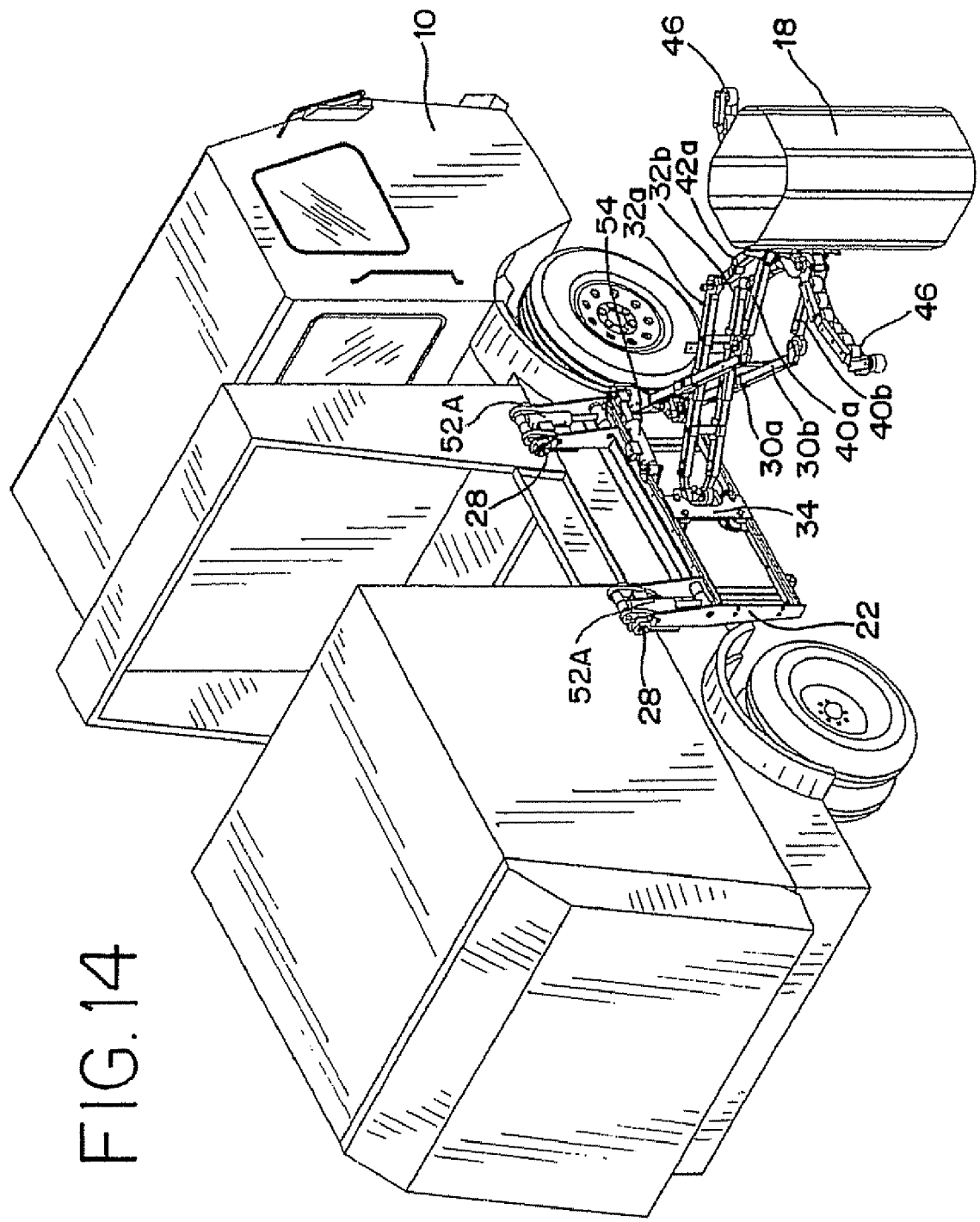
Figure 15:
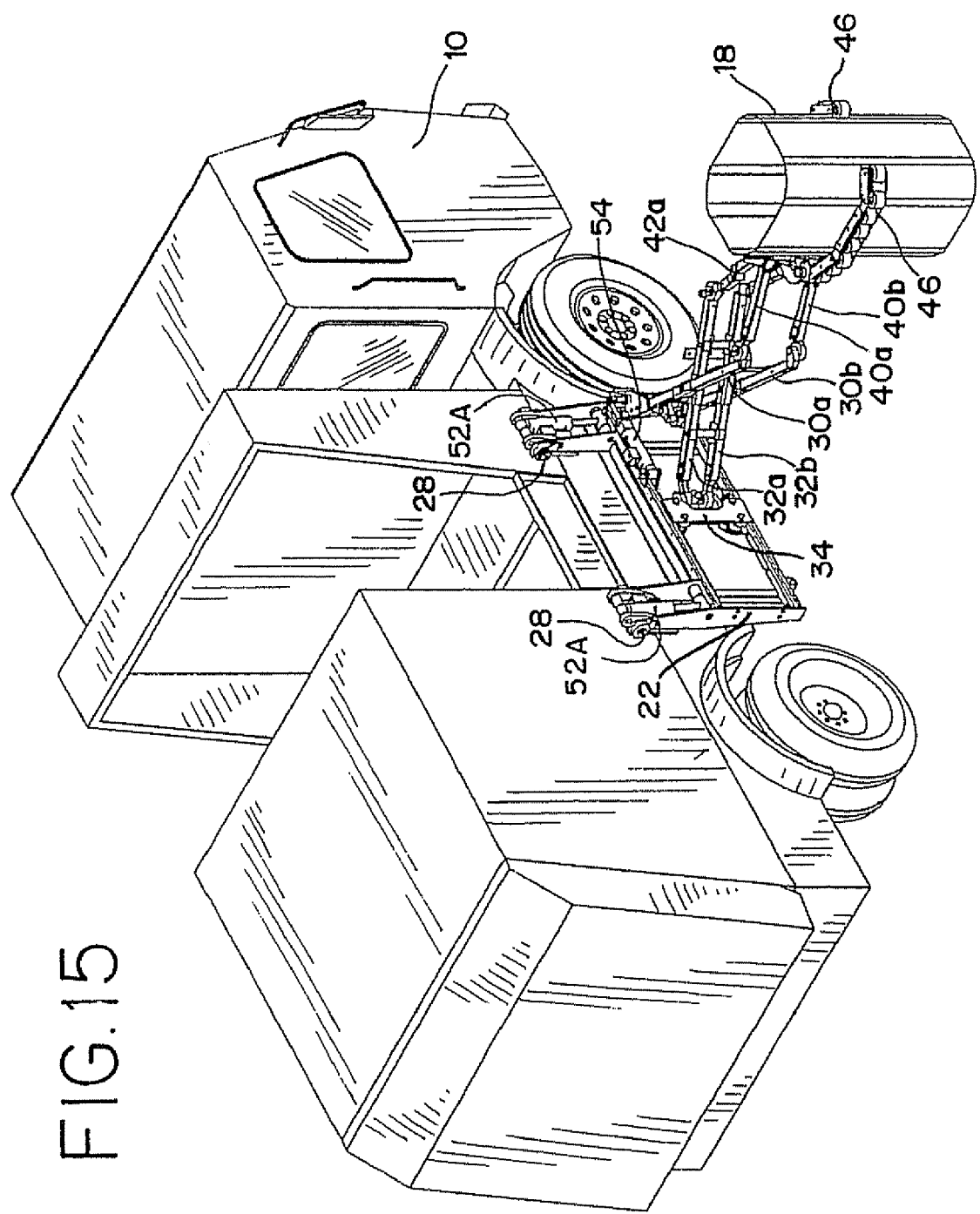
Figure 16:
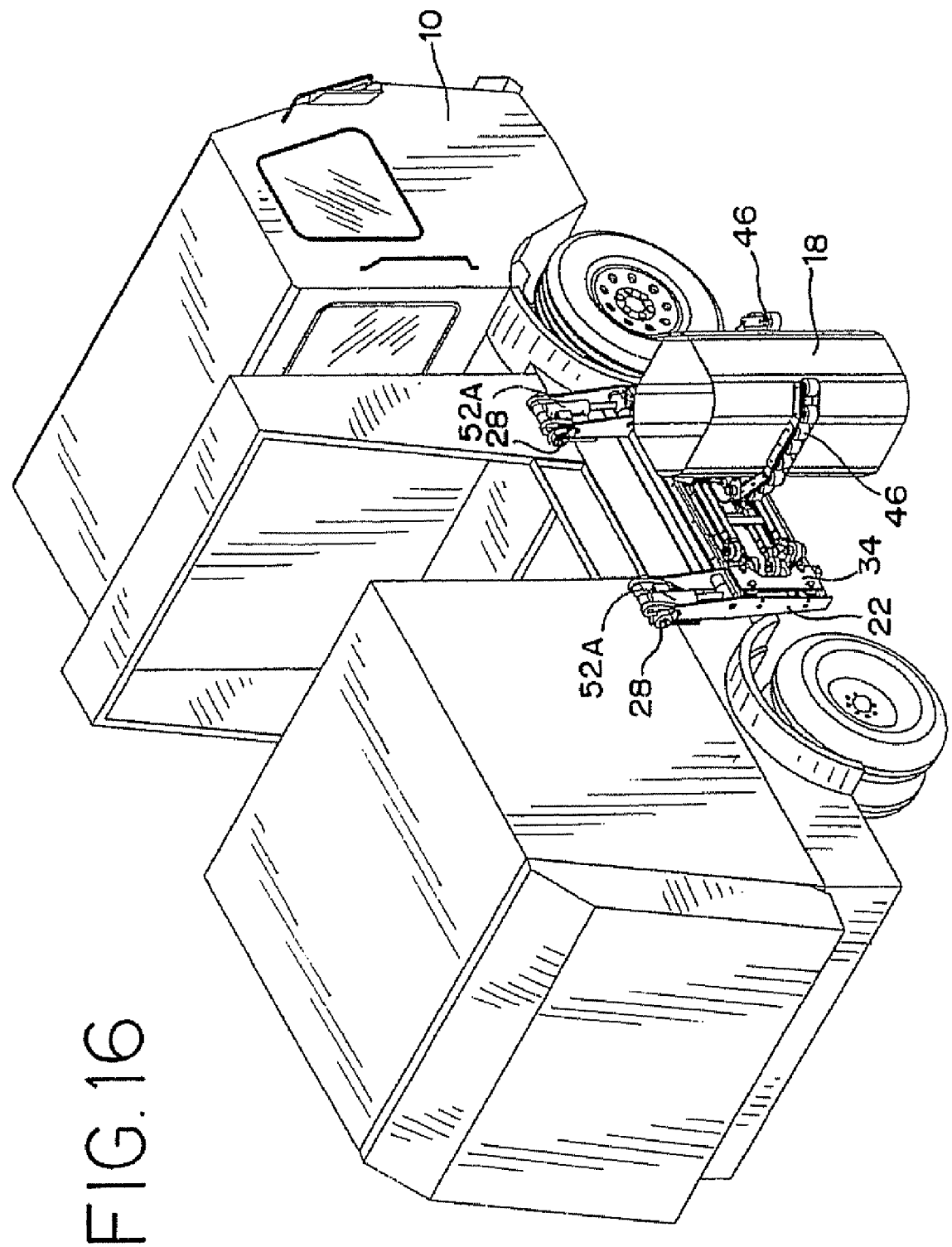
Figure 17:
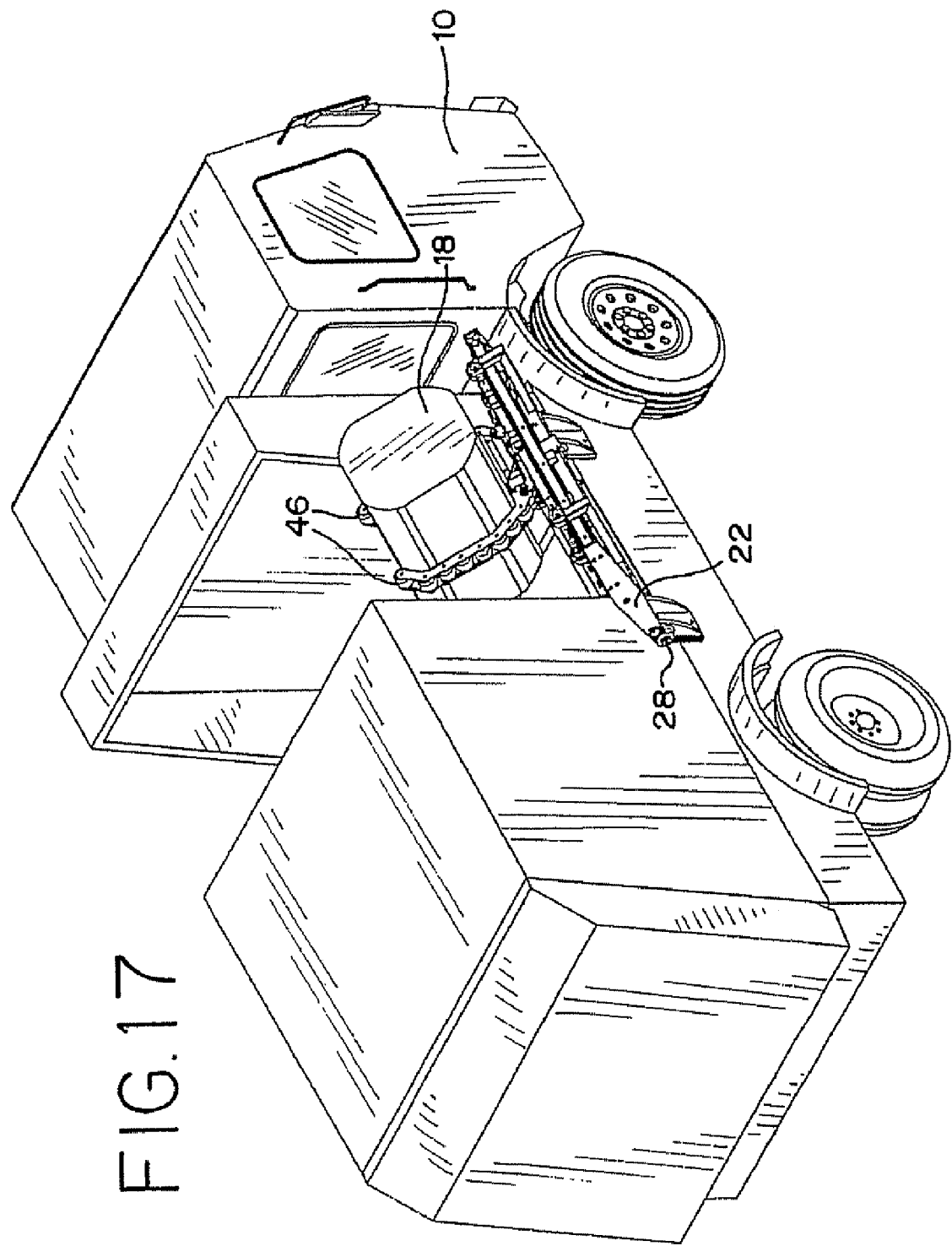

A first actuator 52 is provided for pivoting the frame 22 with respect to the intermediate refuse collection container 16. As shown, the actuator 22 is a hydraulic piston and cylinder, with the cylinder mounted on a lower bracket below the front wall 24b of the intermediate refuse collection container 16 and the piston shaft pivotally mounted to the ear portion 26 of the frame 22. However, other types of actuators, such as rotary hydraulic actuators, may also be employed. Further, the first actuator 52 can be mounted along the side wall 24a of the intermediate refuse collection container between the front and rear walls, as shown for example in FIGS. 11 and 12.

A second actuator 54 is utilized for moving the first ends of the first and second pair of support arms toward each other, so that the second or free ends move away from the first position adjacent to the lateral side wall to a second position extending away therefrom. As illustrated (see FIG. 2), the second actuator 54 is connected between the frame 22 and one of the first pair of support arms 30a, 30b. However, the actuator could be located and/or connected to, e.g., the frame and the slidable support member to achieve the same purpose.

A third actuator 56 is provided for sliding the gear rack 50 so as to move the grabber arms 46 between their first and second positions.

Figure 6:
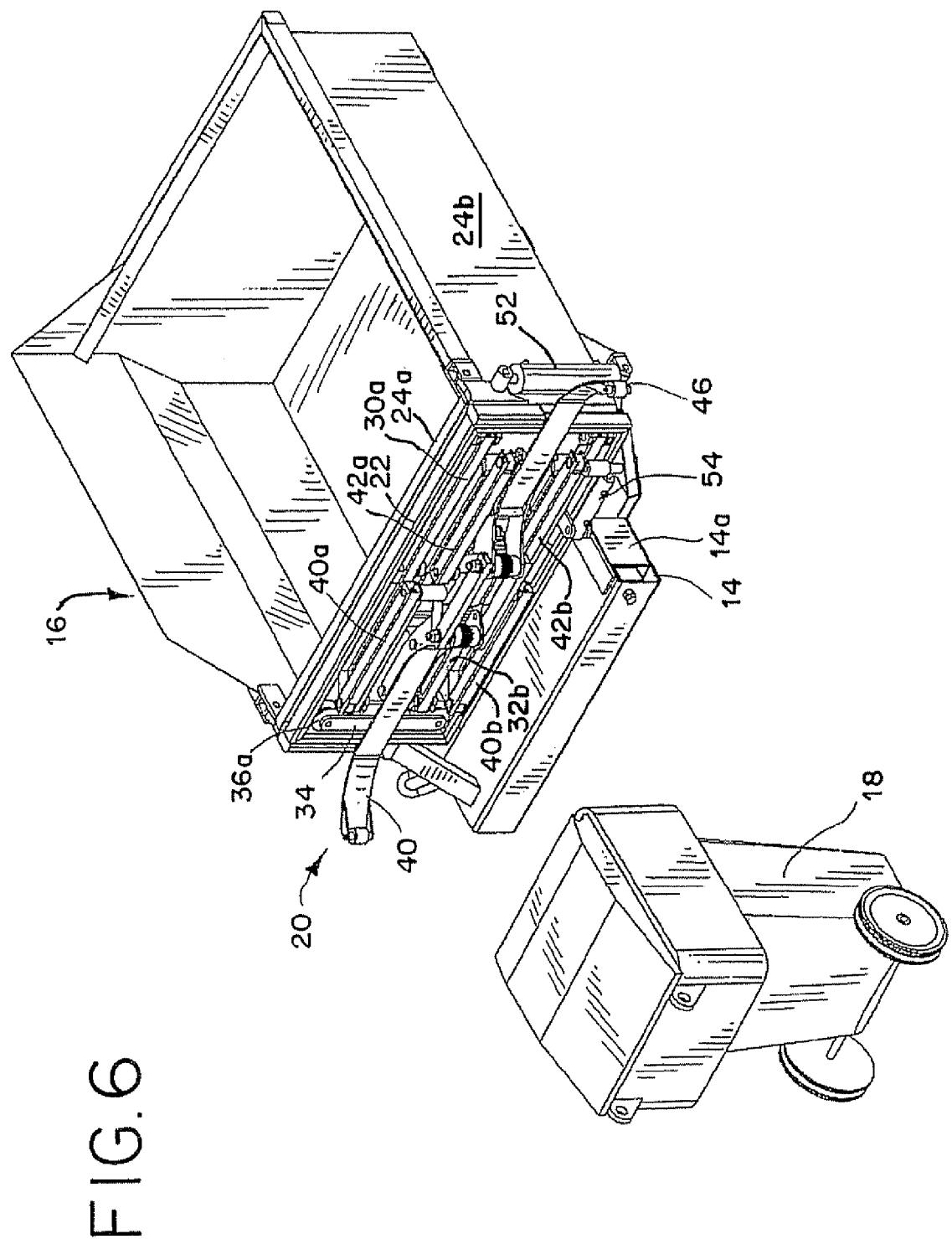
FIGS. 6-10 illustrate a sequence of using the container lifter of FIG. 1 to dump the contents of a smaller, residential-size refuse collection cart into the larger front-load refuse receptacle.
Figure 9:
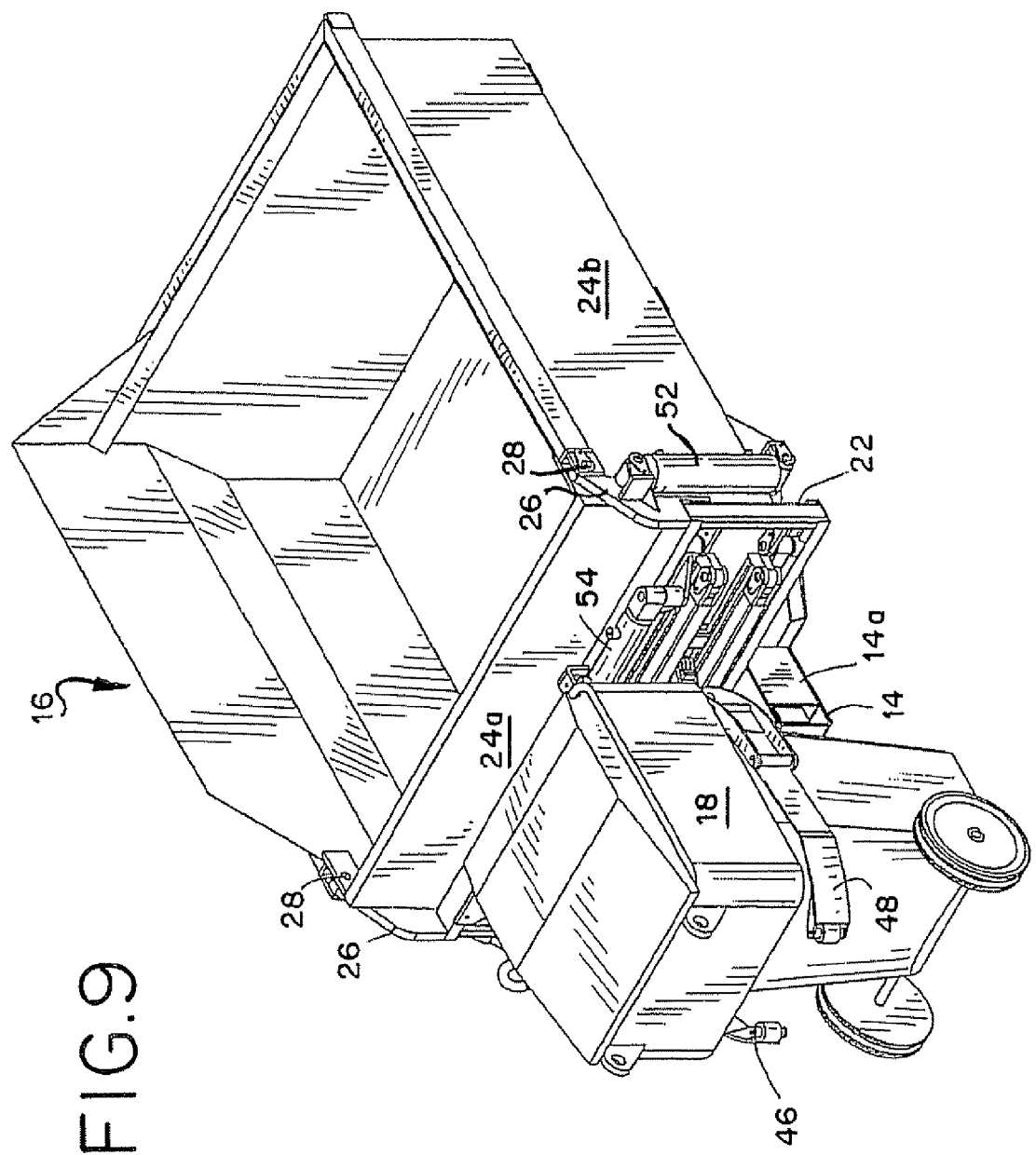

With reference generally to FIGS. 1 and 6-10, the sequence of operation of the container lifter 20 is shown. In use in the normal pick-up mode, the intermediate refuse collection container 16 is carried on the forks 12 in front of the vehicle cab 10. The vehicle stops so that the intermediate front-load refuse receptacle 16 is spaced laterally from the residential refuse collection cart 18, as shown in FIG. 6. The second actuator 54 is activated, moving the first ends of the first and second pair of support arms 30a, 30b and 32a, 32b toward each other so that the second or free ends thereof move away from the first position adjacent to the lateral side wall 24a of the larger front-load refuse receptacle 16 to the second position extending toward the residential refuse collection cart 18 with the further arm members 40a, 40b and 42a, 42b reaching the collection cart 18. The third actuator 56 is then activated so that the grabber arms 46 capture the residential refuse collection cart 18, as shown in FIGS. 7 and 8. Then, after a slight lifting of the cart 18 off the ground by pivoting the frame 22 with the first actuator 52, the second actuator 54 is activated again to draw the support arms 30a, 30b, 32a, 32b, 40a, 40b, 42a, 42b and the associated grabber mechanism 44, along with the residential refuse collection cart 18, back toward the intermediate, front-load refuse receptacle 16, as shown in FIG. 9.

Figure 10:
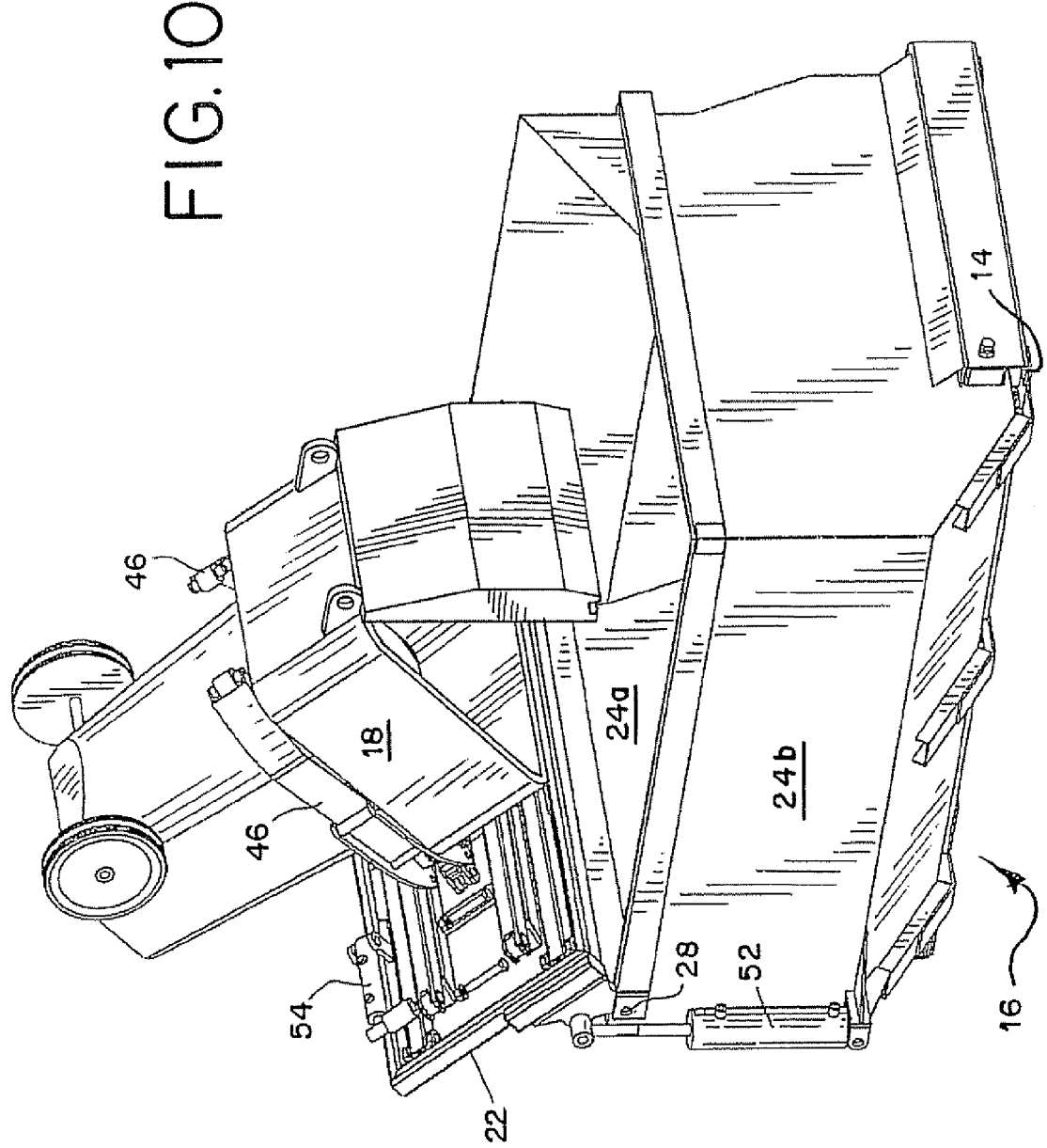

The first actuator 52 is then activated to fully pivot the frame 22 with respect to the side wall 24a of the larger refuse receptacle to move the residential collection cart 18 to an inverted dumping position, thus emptying the contents of the cart 18 into the intermediate refuse receptacle 16, as shown in FIG. 10. The steps are then performed in reverse order to return the residential refuse collection cart 18 to its original position. After the cart 18 is released, the lifter is retracted to its first position adjacent the side wall of the larger collection container. The close nesting arrangement, which may be seen in FIGS. 1 and 2, allows the intermediate container 16 to be lifted and dumped without interfering with the refuse collection vehicle lift mechanism.

While the lifter according to the present invention may be advantageously mounted to the side wall of a fork mounted intermediate collection container, as shown with the embodiments of FIGS. 1-12, the lifter may also be mounted directly to the side of the collection vehicle to dump the contents of a collection cart directly into the collection container mounted to the collection vehicle rearward of the vehicle cab, with the sequence of operating being shown in FIGS. 13-17. The lifter shown in these FIGS. 13-17 is substantially similar to that shown in FIGS. 1-12, except that it employs two actuators 52A for pivoting the frame for the lifter to and from the inverted, dump position. Otherwise, identical reference numerals are used for corresponding parts.

In keeping with another aspect of the invention, a cart lifter is provided that comprises a mounting plate that is pivotally attached to the refuse collection container or vehicle. The mounting plate is pivotable with respect to the refuse collection container or vehicle by means of an actuator for inverting and dumping a refuse collection cart. A pair of first support arms are pivotally attached to the mounting plate, with each first support arm having a second support arm pivotally mounted to its free end. A cart grabber is mounted to the free ends of the second support arms, and a further actuator is provided for moving the grabber mechanism between the engagement and release positions. A connecting arm is pivotally connected to each of the second support arms intermediate the pivoting connections with the first support arms in the cart grabber and a link arm pivotally connects the mounting plate and the connecting arm. A third actuator pivotally connects the mounting plate and one of the first support arms in order to move the support arms between a first position adjacent vehicle or container and a second position spaced therefrom.

Turning now to FIGS. 19-24, a further embodiment of a front load container lifter generally designated 60, is shown. In this embodiment, a mounting plate 62 is provided which may comprise a weldment or assembly of several different pieces. The mounting plate 62 is pivotally attached about a generally horizontal axis to the intermediate refuse collection container 64 adjacent the rear edge of the lateral side wall 66a.

Of course, the mounting plate 62 can be secured to other walls of the larger collection container, or to the chassis or body of a side loading refuse collection vehicle, or to a stationary container or compactor, without departing from the invention.

A first actuator 68 is provided for pivoting the mounting plate 62 with respect to the intermediate refuse collection container 64 about the horizontal axis, which serves to invert a residential collection cart held by the lifter. As shown, the first actuator 68 is a piston-cylinder type actuator that is pivotally connected to both the rear wall 66*b* of the collection container 64 and the mounting plate 62.

The lifter 60 also includes a cart grabber mechanism 70 having arms or hooks (arms 72 shown) for selectively engaging and releasing a smaller residential refuse collection cart. As noted with the embodiment above, various other mechanisms for engaging and releasing the collection cart may be employed without departing from the invention. A second actuator 74 is associated with the grabber mechanism 70 for moving the arms or hooks (again, arms 72 shown) between the engagement and release positions.

In order to move the cart grabber mechanism 70 between a first position adjacent the side wall 66*a* of the intermediate refuse collection container 64 (FIGS. 19, 21 and 23) and the position spaced therefrom for engaging and/or releasing a smaller refuse collection cart, a pair of first support arms 76*a*, 76*b* are pivotally attached to the mounting plate 62. Each first support arm 76*a*, 76*b* has, in turn, a second support arm 78*a*, 78*b* pivotally mounted to its free end, the cart grabber mechanism 70 being mounted to the free ends of the second support arms.

A connecting arm 80 is pivotally connected to each of the second support arms 78*a*, 78*b* at a position intermediate the pivoting connections with the first support arms 76*a*, 76*b* and the cart grabber mechanism 70. This connecting arm 80 ensures that, as the first and second support arms 76*a*, 76*b* and 78*a*, 78*b* pivot with respect to both the mounting plate 62 and each other, a substantially parallel relation is maintained between both first support arms 76*a*, 76*b* and both second support arms 78*a*, 78*b*.

A link arm 82 is pivotally connected to the mounting plate 62 and the connecting arm 80 so that, as the first support arms 76*a*, 76*b* pivot away from a first position adjacent the side wall 66*a* of the intermediate refuse collection container 64, the second support arms 78*a*, 78*b* will pivot from a nesting relationship with the first support arms 76*a*, 76*b* adjacent to the refuse collection container side wall, toward a position in which the second support arms are in axial alignment with the first support arms.

A third actuator 84 is provided that is pivotally connected to the mounting plate 62 and one of the first support arms 76*a*, 76*b* for moving the support arms 76*a*, 76*b* and 78*a*, 78*b* and the cart grabber mechanism 70 laterally of the intermediate refuse collection container 64. As shown, the third actuator 84 is a piston-cylinder type actuator.

Figure 25:
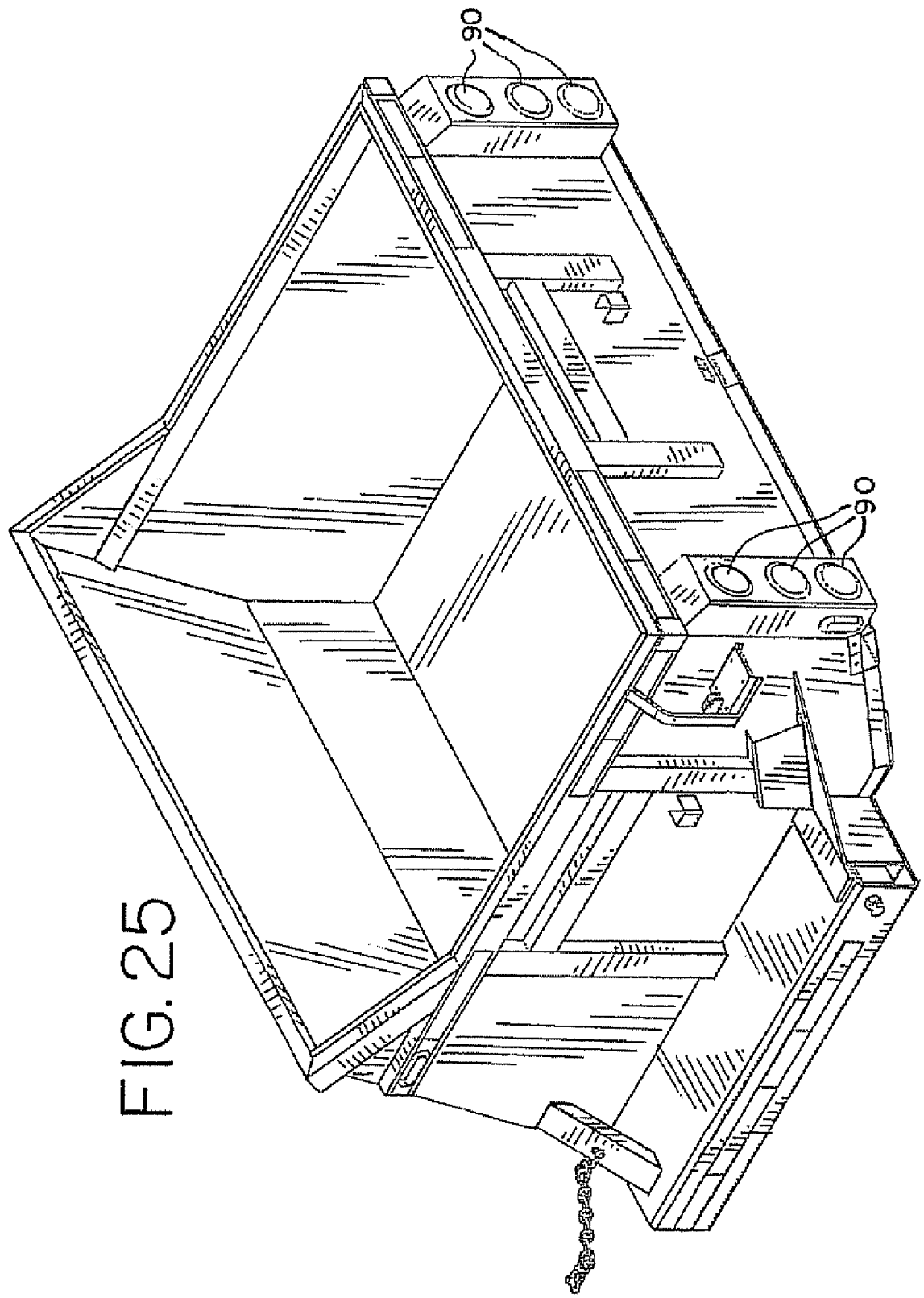
FIGS. 25-28 are perspective views of improved larger front-load refuse collection receptacles that may be used in conjunction with the cart lifter of the present invention.
Figure 26:
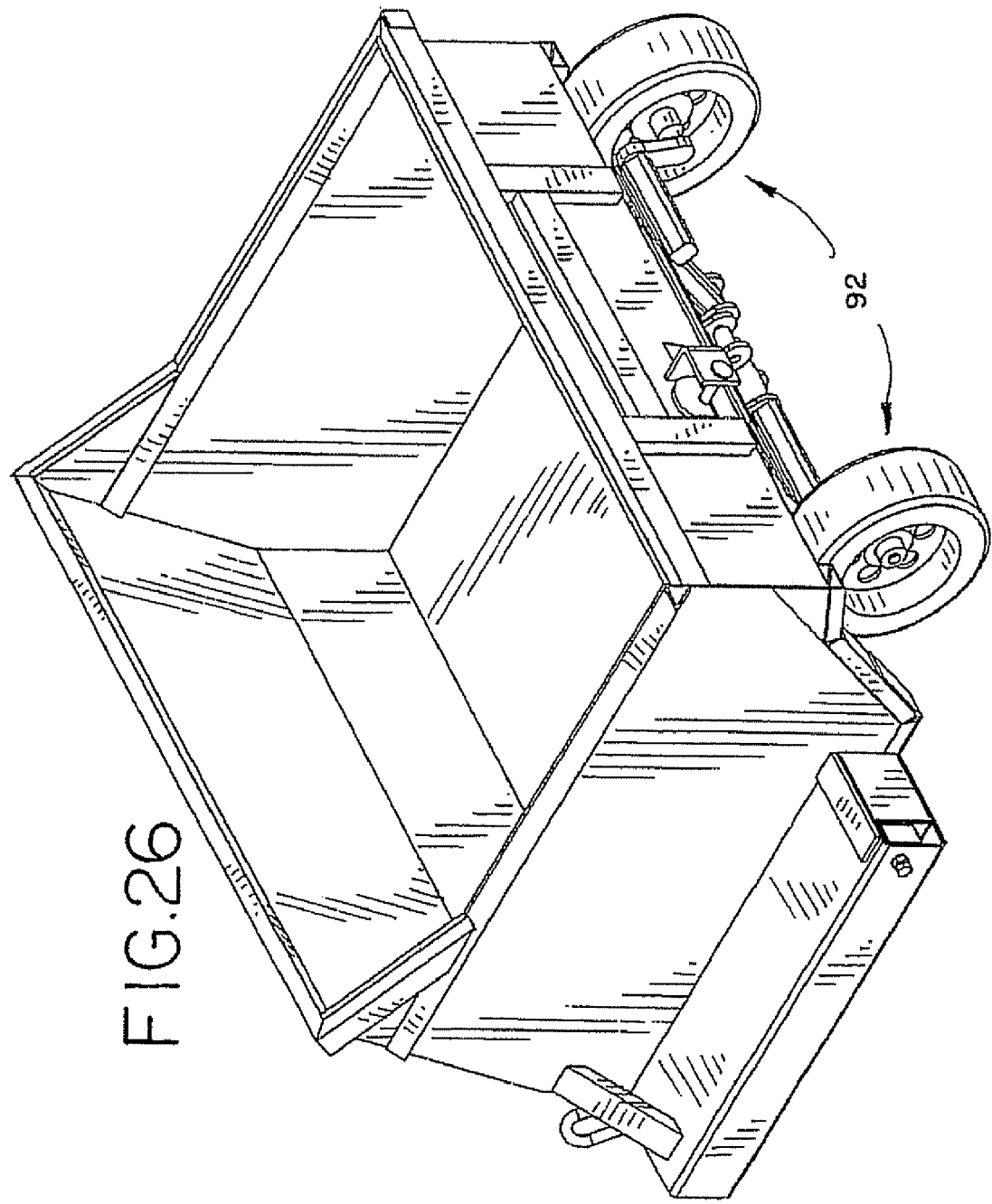
Figure 27:
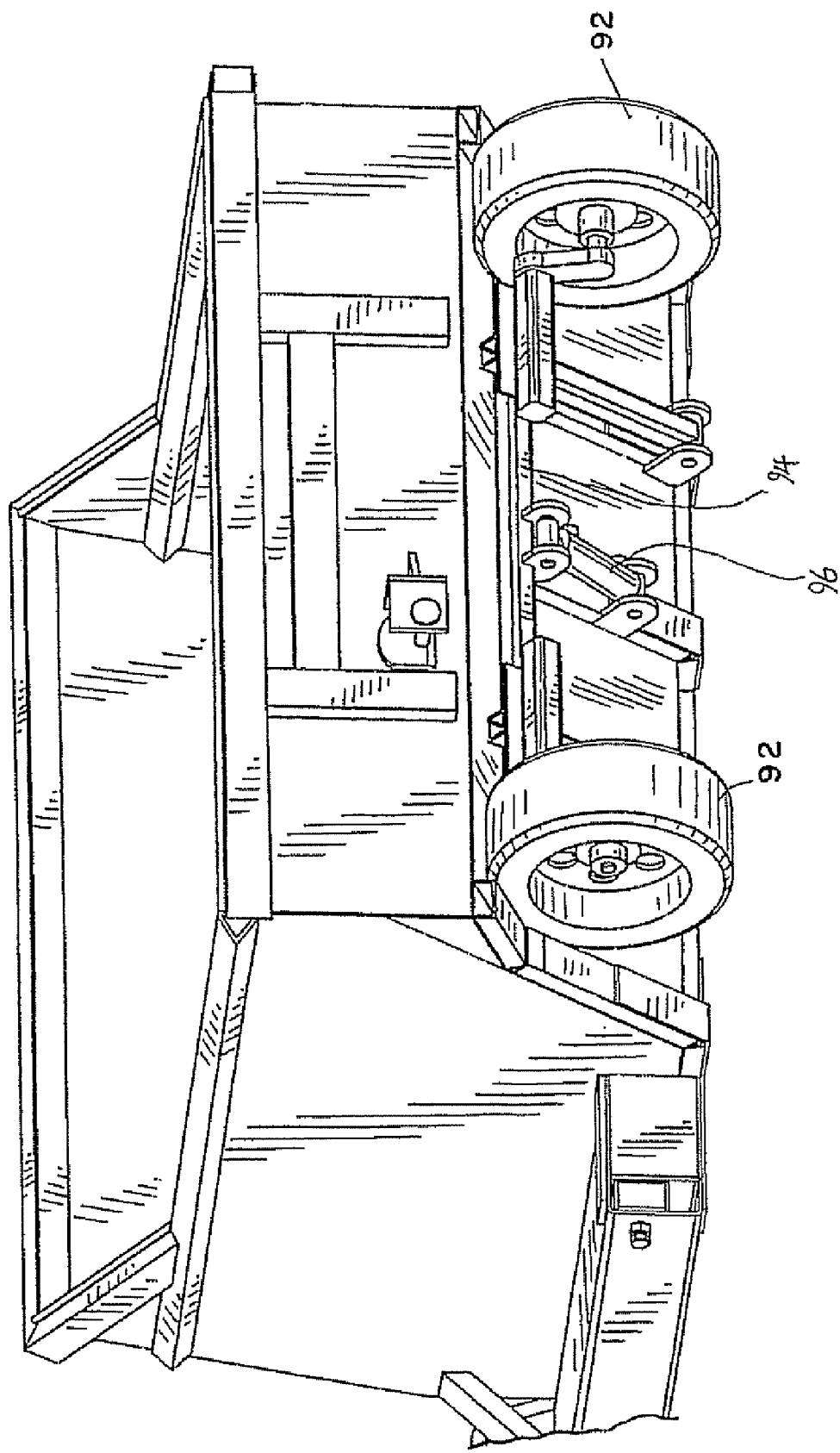
Figure 28:
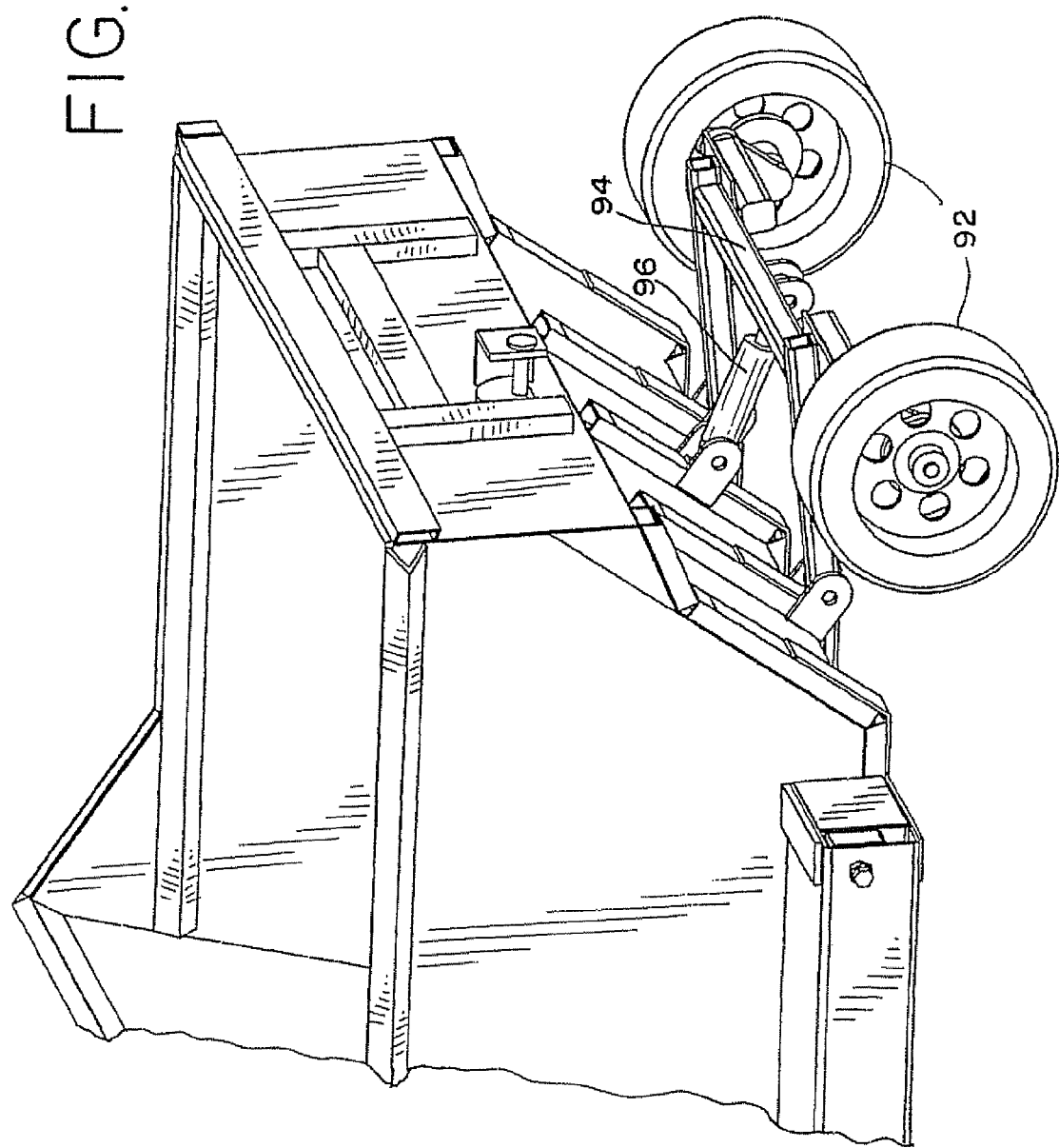

Turning to FIGS. 25-28, improved intermediate refuse collection containers are shown that may be advantageously used with the cart lifters disclosed herein. With reference to FIG. 25, headlights, running lights and turn signals or emergency lights 90 are preferably mounted to the front wall of intermediate collection container to facilitate use in low light conditions when the corresponding lights of the collection vehicle may be blocked by the intermediate refuse collection container. Further, with reference to FIGS. 26-28, the forward portion of the intermediate refuse container may be provided with idler wheels 92, which may be retractable, to provide rolling support for the intermediate refuse collection container on the ground as the collection vehicle advances. As best seen in FIGS. 27 and 28, the idler wheels are mounted on a pivoting frame 94 that may be moved from a raised, retracted position (as seen in FIG. 27) to a lowered, ground-engaging position (as seen in FIG. 28) by means of an actuator, such as hydraulic piston 96.

Thus, a cart lifter has been disclosed having various advantages and features. While the cart lifter has been disclosed in terms of certain preferred embodiments, there is no intent to limit the invention to the same. Instead, the invention is defined by the following claims.

The invention claimed is:

1. A refuse collection system for collecting refuse from a collection cart, the system comprising:
    a refuse container having a plurality of walls each having a top edge and defining a loading area;
    a collection cart lifter comprising a support pivotably mounted adjacent to the top edge of one of the walls of the loading area of the refuse container;
    first and second support arms carried by the support, each support arm having a first end pivotally associated with the support and a second free end, the support arms being pivotally connected with one another at a position intermediate the ends of the arms;
    the support arms being movable with respect to the support between a first position in which the arms are adjacent the refuse container and a second position in which the arms are relatively angularly disposed, with free ends of the support arms spaced from the support;
    a container capturer for engaging and releasing a refuse collection cart, the free ends of each of the support arms being adapted to support the container capturer over the top edge of said one of the walls;
    a first actuator for pivoting the support relative to the refuse container between a first position and a second inverted position for dumping a collection cart over the top edge of said one of the walls;
    a second actuator for moving the support arms between the first and second positions; and
    a third actuator for actuating the container capturer.

2. The refuse collection system of claim 1 wherein the support of the cart lifter comprises a track and at least one of the support arms is slidable along the track.

3. The refuse collection system of claim 2 wherein the second actuator of the cart lifter is connected to the slidable at least one of the support arm arms to move it along the track.

4. The refuse collection system of claim 1 wherein the support of the cart lifter comprises a track and the first support arm is slidable along the track and the first end of the second support arm is pivotally associated with the support about a fixed pivot point.

5. The refuse collection system of claim 4 wherein the second actuator of the cart lifter is connected to the first support arm to move it along the track.

6. The refuse collection system of claim 1 wherein the cart lifter comprises a third support arm interposed between the free end of the first support arm and the container capturer and a fourth support arm interposed between the free end of the second support arm and the container capturer.

7. The refuse collection system of claim 1 wherein the first actuator of the cart lifter is mounted to an intermediate location of the support.

8. The refuse collection system of claim 1 wherein the first actuator of the cart lifter comprises two separate actuators, one mounted to each end of the support.

9. The refuse collection system of claim 1 wherein the first ends of the first and second arms of the cart lifter are pivotally associated with the support about fixed pivot points and the first and second support arms are pivotally connected with one another about a sliding pivot.

10. The refuse collection system of claim 1 wherein the refuse container comprises an intermediate refuse collection container having sleeves for receiving lift forks of a refuse collection vehicle.

11. The refuse collection system of claim 1 wherein the refuse container is mounted to a collection vehicle such that the cart lifter is mounted to a side of the vehicle.

12. A refuse collection system for collecting refuse from a collection cart, the system comprising:

- a refuse container configured for mounting on lift forks of a front loading refuse collection vehicle comprising a collection container and a container capturer for engaging and releasing a refuse collection cart, the collection container having a plurality of walls each having a top edge and defining a loading area;
- a collection cart lifter comprising a support pivotally mounted adjacent to the top edge of one of the walls of the loading area of the collection container;
- first and second support arms carried by the support, each support arm having a first end pivotally associated with the support and a second free end, the support arms being pivotally connected with one another at a position intermediate the ends of the arms;
- the support arms being movable with respect to the support between a first position in which the arms are adjacent the collection container and a second position in which the arms are relatively angularly disposed, with free ends of the support arms spaced from the support, the free ends of each of the support arms being adapted to support the container capturer;
- a first actuator for pivoting the support relative to the collection container between a first position and a second inverted position for dumping a collection cart;
- a second actuator for moving the support arms between the first and second positions; and
- a third actuator for actuating the container capturer.

13. A refuse collection system for collecting refuse from a collection cart, the system comprising:

- a refuse collection vehicle having a vehicle cab;
- a refuse container mounted to the refuse collection vehicle rearwardly of the vehicle cab and having a plurality of walls, each having a top edge and defining a loading area;
- a collection cart lifter comprising a support pivotally mounted adjacent to the top edge of a side wall of the loading area of the refuse container;
- first and second support arms carried by the support, each support arm having a first end pivotally associated with the support and a second free end, the support arms being pivotally connected with one another at a position intermediate the ends of the arms;
- the support arms being movable with respect to the support between a first position in which the arms are adjacent the refuse collection vehicle and a second position in which the arms are relatively angularly disposed, with free ends of the support arms spaced from the support;
- a container capturer for engaging and releasing a refuse collection cart, the free ends of each of the support arms being adapted to support the container capturer;
- a first actuator for pivoting the support relative to the refuse collection vehicle between a first position and a second inverted position for dumping a collection cart over the top edge of the side wall;
- a second actuator for moving the support arms between the first and second positions; and
- a third actuator for actuating the container capturer.

* * * * *